(12) United States Patent
Sato et al.

(10) Patent No.: US 7,124,200 B2
(45) Date of Patent: Oct. 17, 2006

(54) ROUTING APPARATUS

(75) Inventors: Kazuyuki Sato, Sendai (JP); Takuya Terasawa, Sendai (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 09/767,302

(22) Filed: Jan. 23, 2001

(65) Prior Publication Data

US 2002/0038379 A1    Mar. 28, 2002

(30) Foreign Application Priority Data

Sep. 28, 2000    (JP) ............................ 2000-295841

(51) Int. Cl.
*G06F 15/173*    (2006.01)
(52) U.S. Cl. ................................... 709/239
(58) Field of Classification Search ........ 709/231–245; 711/128

See application file for complete search history.

(56) References Cited

U.S. PATENT DOCUMENTS

| | | | | |
|---|---|---|---|---|
| 4,736,362 A | * | 4/1988 | Clark et al. .................. | 370/363 |
| 5,333,131 A | * | 7/1994 | Tanabe et al. ............... | 370/397 |
| 5,341,234 A | * | 8/1994 | Suzuki et al. ................. | 398/51 |
| 5,737,404 A | * | 4/1998 | Segal ........................... | 379/230 |
| 5,859,846 A | * | 1/1999 | Kim et al. ............. | 370/395.62 |
| 6,044,080 A | * | 3/2000 | Antonov ...................... | 370/401 |
| 6,363,319 B1 | * | 3/2002 | Hsu ............................. | 701/202 |
| 6,501,757 B1 | * | 12/2002 | Kamaraj et al. ....... | 370/395.41 |

FOREIGN PATENT DOCUMENTS

JP    61177700    8/1986

\* cited by examiner

*Primary Examiner*—David Wiley
*Assistant Examiner*—J. Bret Dennison
(74) *Attorney, Agent, or Firm*—Katten Muchin Rosenman LLP

(57) ABSTRACT

Disclosed is a routing apparatus for obtaining routing data conforming to a destination address of a packet that arrives from a line, adding the routing data onto the packet, and switching the packet based upon the routing data to send the packet to a prescribed line. The routing apparatus has a main controller equipped with content addressable memories (CAMs) corresponding to respective ones of line speed. When search key data with an attached line identifier is received from a line card, routing data is generated by the content addressable memory (CAM) corresponding to the line speed and the routing data is sent to the line card. The line card adds routing data of which it has been notified by the main controller onto a packet and then outputs the packet. A switch to which a packet having attached routing data is input from a prescribed line card switches the packet based upon the routing data and sends the packet to another line card.

8 Claims, 18 Drawing Sheets

FIG. 2A

TRANSMISSION OF OC-12C PPP PACKET

| ITEMS | VALUE | | IP DATA FLUCTUATION | TOTAL TRANSFER TIME($\mu$S) |
|---|---|---|---|---|
| OC-12C TRANSFER TIME | 1.6 | | 1 | 0.36 |
| PPP + FIXED PART OF IP HEADER (bytes) | 27 | | 2 | 0.37 |
| IP DATA FLUCTUATION (bytes) | n | | 3 | 0.39 |
| | | | 4 | 0.40 |
| TOTAL TRANSFER TIME = (n + PPP + FIXED PART OF IP) * OC-12C TRANSFER | | | ~ | ~ |
| | | | 10 | 0.48 |
| | | | ~ | ~ |
| | | | 64 | 1.17 |
| | | | ~ | ~ |
| | | | 128 | 1.99 |
| | | | ~ | ~ |
| | | | 1024 | 13.52 |
| | | | ~ | ~ |
| | | | 1500 | 19.64 |

FIG. 2B

TRANSMISSION OF OC-192C PPP PACKET

| ITEMS | VALUE | | IP DATA FLUCTUATION | TOTAL TRANSFER TIME($\mu$S) |
|---|---|---|---|---|
| OC-192C TRANSFER TIME(ns) | 0.1 | | 1 | 0.02 |
| PPP + FIXED PART OF IP HEADER (bytes) | 27 | | 2 | 0.02 |
| IP DATA FLUCTUATION (bytes) | n | | 3 | 0.02 |
| | | | 4 | 0.02 |
| TOTAL TRANSFER TIME = (n + PPP + FIXED PART OF IP) * OC-192C TRANSFER | | | ~ | ~ |
| | | | 10 | 0.03 |
| | | | ~ | ~ |
| | | | 64 | 0.07 |
| | | | ~ | ~ |
| | | | 128 | 0.12 |
| | | | ~ | ~ |
| | | | 1024 | 0.84 |
| | | | ~ | ~ |
| | | | 1500 | 1.23 |

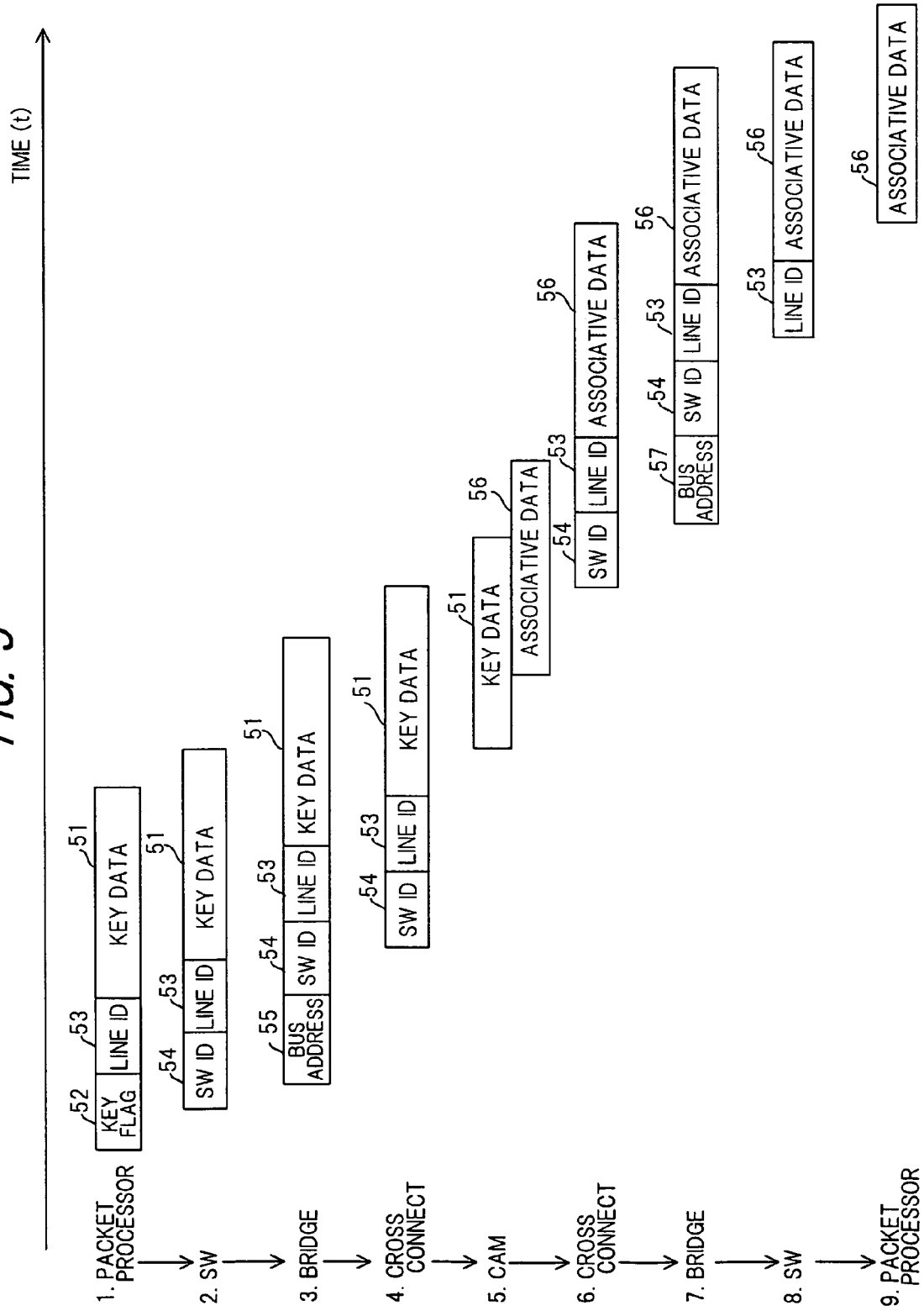

| RAM CELL WIDTH (bytes) | | 1 | 1 |
|---|---|---|---|
| RAM CELL WORD COUNT | y | 1,000 | 16,384 |
| KEY DATA WIDTH (bytes) | k | 4 | 16 |
| ASSOCIATIVE DATA WIDTH (bytes) | r | 2 | 2 |
| TOTAL ENTRY COUNT | | ↓ | ↓ |
| e=y/(k+r) | = | 167 | 910 |

ROUTING APPARATUS

BACKGROUND OF THE INVENTION

This invention relates to a routing apparatus that uses a CAM (Content Addressable Memory) when routing is performed in a network such as the Internet or ATM network. More particularly, the invention relates to a routing apparatus for obtaining routing data, which conforms to the destination address of a packet that arrives from a line, from a CAM, adding the routing data onto the packet, and switching the packet based upon this routing data to send the packet to a prescribed line.

The processing speeds of routers and ATM switches is increasing with the explosive spread of the Internet and ATM networks. Owing to lines packed in higher densities, tables for searching data (routing data) necessary for routing and switching are increasing in capacity.

Methods of searching routing data rely upon conventional processing technology using a CAM. However, an increase in the capacity CAMs is accompanied by the need for a large number of CAMs if the CAMs are of the usual capacity. It is difficult to package all the CAMs on an ordinary LSI chip. Therefore, a CAM of large capacity is recently available on the market as a special-purpose LSI chip.

FIG. 15 is a block diagram illustrating the general structure of a router according to the prior art. This will be used to describe an overview of a search method using a CAM in an ordinary router. The router has a main controller (CPU) 1, a switch 2 and line cards $3_1$~$3_n$, $4_1$~$4_n$ provided between lines and the switch 2. Data transmission over a line generally is transmission using POS (Packet over SONET or Packet over SONET). With POS, an IP packet is mapped to an SDH or SONET payload and then transmitted. Line terminators (not shown) separate IP packets from the POS lines and input the IP packets to line cards $3_1$~$3_n$. A packet processor 3a in each of the line cards $3_1$~$3_n$ extracts the destination address of the IP packet, acquires routing data conforming to the destination address from a CAM 3b, adds the routing address onto the packet and inputs the packet to the switch 2. On the basis of routing data attached to packets which enter from the line cards $3_1$~$3_n$, the switch 2 switches these packets and inputs them to different line cards $4_1$~$4_n$. Packet processors in the line cards $3_1$~$3_n$ remove the routing data from the packets, subsequently map the packets to the payloads of SDH or SONET frames and send the packets to POS lines.

FIG. 16 is a block diagram of a line card illustrating the CAM 3b as being separated into a CAM LSI chip $3b_1$ and an associative memory $3b_2$. FIG. 17 is a flowchart of a CAM search. A key-data memory (not shown) of the CAM LSI chip $3b_1$ stores key data conforming to a number of destination addresses, and the associative memory $3b_2$ stores routing data. The IP header of an IP packet has a destination address DA (destination address=IP address). When the IP packet enters the packet processor 3a of any of the line cards $3_1$~$3_n$ (step 101), therefore, the destination address DA is extracted (step 102) from the IP packet that has entered and the destination address is transferred as key data to the CAM 3b, which has a conversion table, in advance. The CAM LSI chip $3b_1$ of the CAM 3b checks to determine whether an IP address corresponding to this key data exists in the key-data memory. If the IP address exists, the CAM LSI chip $3b_1$ converts this key data to an address of the associative memory $3b_2$ and sends the latter to the associative memory $3b_2$ (step 103). The associative memory $3b_2$, which is constituted by a RAM, outputs preset associative data, e.g., a highway number HW-No. that is necessary for switching, based upon the entered address. Immediately before outputting the IP packet, the packet processor 3a adds this highway number HW-No. onto the packet and then inputs the packet to the switch 2. The latter performs routing (step 104) using the highway number HW-No.

FIG. 18 is a block diagram showing the details of the conventional router. Components in FIG. 18 identical with those shown in FIGS. 15 to 17 are designated by like reference characters. Main controllers 1, 1' are redundant in order to improve reliability and are identically constructed. Specifically, the main controllers 1, 1' respectively include: (1) main processors (MPU) 1a, 1a'; (2) main memories (MM) 1b, 1b'; (3) cache memories (not shown); (4) MPU bus conversion bridges 1c, 1c' for connecting various devices such as input/output units and a CAM to the MPU; (5) output-port search CAMs 1d, 1d' for when the main controller performs communication with the neighboring router; (6) Ethernet switching hubs 1e, 1e' for transferring routing tables created by the main controller to each of the line cards $3_1$~$3_n$ via the switch 2 on separate lines; and (7) MPU bus conversion bridges 1f, 1f' for sending the MPU packets addressed to this router that arrive from the line cards via the switch.

The line cards $3_1$~$3_n$ accommodate various lines such as SONET or SDH lines and are identically constructed. The speeds of the lines accommodated by each line card are the same but the line speeds differ from one card to another. The packet processor 3a (1) extracts the destination address DA of a packet that arrives via a POS line or the like and sends this destination address DA to the CAM as key data for searching routing data; (2) adds the routing data (highway number HW-No.) onto the packet and sends the packet to the switch; and (3) removes routing data from a switched packet and sends the packet to a line. The CAM 3b has the CAM LSI chip and associative memory (see FIG. 16) and obtains routing data (highway number HW-No.) from the destination address DA that has entered as key data. The CAM 3b executes the reverse of this operation as well. A LAN controller (LANC) 3c receives routing data by communicating with switching hubs 1e, 1e' of the main controllers. A local MPU 3d controls the LAN controller 3c and controls the configuration internally of the line card.

The switch 2 controls the exchange of packets between the line cards and the main controllers 1, 1' and controls the exchange of packets between the line cards.

FIG. 19 is an explanatory view illustrating the flow of packets in the conventional router.

1) A data packet that has entered from a POS line is separated into packets by the input section of a line card 3. It should be noted that PPP in FIG. 19 signifies Point-to-Point Protocol.

2) On the basis of the IP destination address DA in the packet header, the packet processor 3a searches the CAM 3b for a highway number HW-No. and other necessary information (QOS information, filtering information, etc.), adds the HW-No. and other information onto the packet (the payload portion thereof) and transfers the packet to the switch 2.

3) The switch 2 switches the packet based upon the routing data HW-No. and other information and inputs the packet to a line card 4 on the egress side. A packet processor 4a in the line card 4 removes the routing data HW-No. and other information from the packet that enters from the switch.

4) The packet processor 4*a* finally maps the packet to the payload of an SDH or SONET frame and sends the packet to a POS line. This completes routing processing in its entirety.

FIG. 20 is a diagram illustrating the internal structure of the CAM LSI chip. The CAM LSI 3*b*$_1$ has an address decoder 5*a*, a memory array 5*b*, an index register 5*c*, a mask register 5*d*, a response register 5*e* and a priority encoder 5*f*.

The address decoder 5*a* decodes address data and stores separately input key data at a prescribed address of the memory array 5*b* or reads key data out of the memory array 5*b* and outputs the same. The memory array 5*b* stores key data conforming to the number of destination addresses, and the index register 5*c* stores key data desired to be searched (i.e., search key data), e.g., key data conforming to the destination address of a packet received from a POS line. The mask register 5*d* specifies the bit position to be masked in the search key data (masking is performed by logical "1"). The response register 5*e* stores (1) the result of performing matching (comparison) between key data, which has been stored in the memory array 5*b*, and search key data or (2) the result of performing matching between key data, which has been stored in the memory array 5*b*, and the non-masked portion of the search key data. The priority encoder 5*f* generates an address of the associative memory 3*b*$_2$ based upon the result of matching from the response register 5*e*. The associative memory 3*b*$_2$ outputs associative data (routing data and other information) from the entered address.

The key data shown in FIG. 20 is indicated as being 8-bit data for the sake of explanation; 32-bit data, etc., is employed in actuality. Further, the memory array 5*b* is illustrated as storing eight items of key data, though the memory array 5*b* actually has enough capacity to store a great many items of key data. Further, the memory array 5*b* within the CAM is so adapted that bit width can be varied in dependence upon the application of the CAM search, and the memory array has a register (not shown) for changing the configuration of the memory array. With regard to the associative memory 3*b*$_2$, however, the bit width of the associative addresses and associative data is fixed at the hardware-design stage.

The following problems arise with the conventional routing apparatus (router) using the CAM:

1) High Cost of the CAM LSI Chip

The number of CAM entries is increasing as use of the Internet becomes more widespread. The number of entries that can be processed per CAM LSI chip is 64,000 at most if it is assumed that 36 bits per entry are required. Here 36 is the total of 32 bits required as the destination address in IP-V4 (IP Version 4) and four bits serving as control bits.

2) High Mounting Surface Occupancy of CMI LSI Chips

If it is assumed that 15 CAM LSI chips (4×4 cm in size) are required to be mounted, a high mounting surface occupancy is the result. This requires that the line card have a complicated structure, such as a two-tier structure.

3) Transfer Time of Routing Tables

It is necessary to transfer routing tables to each of the line cards from the main processor of the main controller that performs centralized administration of routing tables. For example, when the system is started up, it is necessary to transfer a routing table from the main processor of the main controller to the CAM mounted on each line card. As a consequence, system start-up takes considerable time and so does recovery at the time of failure.

4) Changing Bit Width of Associative Data

The construction of a CAM is such that the associative memory constituted by a RAM is externally mounted on the CAM LSI. Consequently, if key data is changed from IP-V4 to IP-V6 (4 bytes to 16 bytes), it becomes necessary to change the circuit configuration of the hardware and the line card must be redesigned.

5) Multiple Hits in Key Data

Since the conventional CAM does not possess a statistical processing function, the CAM cannot execute statistical processing at the time of multiple hits, namely when there are multiple items of entry key data for search key data. Consequently, it is required that the MPU of the main controller calculate statistical information by program processing using the main memory (MM), which results in a large head of the MPU.

6) Relationship Between Line Speed and CAM

In the conventional router, a CAM is mounted on a line card and the line card accommodates a plurality of lines of the same speed (an example of mounting is OC-12 lines×4). The reason for this is that in an arrangement in which a line card accommodates lines having different speeds, costs rise because all of the line cards will require a costly CAM of maximal speed. However, with the router of the conventional arrangement in which each card accommodates lines having the same speed, it is required to provide a line card that conforms to each line speed. Depending upon the network, there will be line cards that cannot be used and situations will arise in which the lines accommodated by line cards are too few in number. In other words, the conventional routing apparatus is such that the line cards have a poor line accommodating efficiency, and the apparatus is high is cost.

SUMMARY OF THE INVENTION

Accordingly, an object of the present invention is to provide a low-cost and compact routing apparatus.

Another object of the present invention is to reduce the number of CAMs used to thereby lower cost and raise the mounting efficiency of the routing apparatus.

A further object of the present invention is to improve the reliability of a routing apparatus by making it possible to resume operation following the occurrence of a failure.

Still another object of the present invention is to provide a routing apparatus in which it is possible to change the bit width of associative data and key data in a CAM without changing the design of the circuits peripheral to the CAM.

Still another object of the present invention is to so arrange it that processing at the time of multiple hits can be implemented within a CAM LSI chip, thereby reducing the statistical processing of a main processor and alleviating the load upon the main processor.

Still another object of the present invention is to arrange it so that CAMs of different speeds can be used properly for corresponding line speeds and so that a line card can accommodate lines of various line speeds, thereby lowering the cost of the routing apparatus.

Still another object of the present invention is to provide a routing apparatus in which system start-up time can be shortened when the system is turned on and when the system recovers from failure.

According to the present invention, the foregoing objects are attained by providing a routing apparatus for obtaining routing data conforming to a destination address of a packet that arrives from a line, adding the routing data onto the packet, and switching the packet based upon the routing data to send the packet to a prescribed line, comprising: (1) a main controller having a routing data generator for generating routing data conforming to a requested destination address and sending the routing data to a requesting source; (2) a line interface for extracting a destination address from a packet that arrives from a line, generating routing-data request for requesting the main controller so as to be notified of routing data conforming to this destination address, adding the routing data of which notification has been given by the main controller onto the packet and then outputting the packet; and (3) a switch for sending the routing-data request, which enters from a prescribed line interface, to the main controller, sending the routing data from the main controller to a line interface of the requesting source, and switching a packet with attached routing data based upon the routing data to thereby send the packet to another line interface.

The routing data generator of the main controller has: (1) an associative memory for storing routing data; (2) a key-data memory for storing key data conforming to destination addresses; (3) a converter which, when key data conforming to the requested destination address exists in the key-data memory, is for converting this key data to an address of the associative memory; and (4) a routing-data sending unit for reading routing data out of the associative memory from this address and sending this routing data to a line interface that is requesting source.

In accordance with the routing apparatus of the present invention as set forth above, CAMs as the routing data generators disposed in both the individual line cards and main controller in the prior art are consolidated on the side of the main controller to achieve centralized management of the routing tables. This makes it possible to reduce the number of CAMs used by the entire system, thereby lowering cost and raising mounting efficiency.

Further, in accordance with the routing apparatus of the present invention, CAMs need be provided only in the main controller. When the system is started up, therefore, it is unnecessary to transfer routing tables from the main processor of the main controller to the line cards. This makes it possible to shorten system start-up time when power is introduced and when the system recovers from failure.

The routing apparatus of the present invention is such that the main controller is equipped with routing data generators (CAMs) that are associated with respective ones of line speeds. When a line interface issues a routing data request with an attached line identifier, the main controller obtains routing data from the CAM that corresponds to the line speed and sends this routing data to the line interface that is the requesting source. If this arrangement is adopted, CAMs having different speeds can be used respectively for respective ones of the line speeds. Moreover, it is possible for a line card to accommodate lines of various line speeds. This makes it possible to use inexpensive, low-speed CAMs. Since the line accommodating efficiency of line cards is improved, moreover, the routing apparatus can be lowered in cost.

The routing apparatus of the present invention is such that the main controller is provided in duplicate. When a working main controller updates the stored content (routing tables) of each CAM under its control, the routing tables of the CAMs on the standby main controller also are updated. When the working main controller develops a failure, the standby main controller continues routing control by serving as a new working controller. If this expedient is adopted, it is possible to raise reliability at the time of a failure in the above-mentioned arrangement having the CAMs consolidated in the main controller.

In the routing apparatus of the present invention, the associative memory and the key-data memory are constituted by a single memory array, and contiguous first and second areas of the memory array are adopted as the associative memory area and key-data memory area, respectively. A memory access unit for accessing the memory array calculates an entry count e, which is the number of items of key data and the number of items of associative data that can be registered, in accordance with the following equation:

$$e = y/(k+r)$$

where y represents the total number of single-byte cells of the memory array, the width of the key data is k bytes and the width of the associative data inclusive of routing data is r bytes, and performs read/write control for reading and writing the key data and associative data from and to the memory array based upon k, r and e. If this arrangement is adopted, control for varying the bit widths of the associative data and key data can be carried out merely by programmably changing y, k and r; the circuits peripheral to the CAMs need not be altered in design.

The routing apparatus according to the present invention is such that the routing data generators of the main controller are made to manage the entry count and entry key data of multiple hits. If this arrangement is adopted, processing at the time of multiple hits can be executed within the CAM LSI chip. This makes it possible to reduce statistical processing by the main processor and, hence, to alleviate the load on the main processor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A, 2B are tables illustrating minimum times for CAM searches;

FIG. 5 is a time chart illustrating timing at which data is sent and received between a CAM and packet processor;

DESCRIPTION OF THE PREFERRED EMBODIMENT (A) System Configuration

Figure 1:
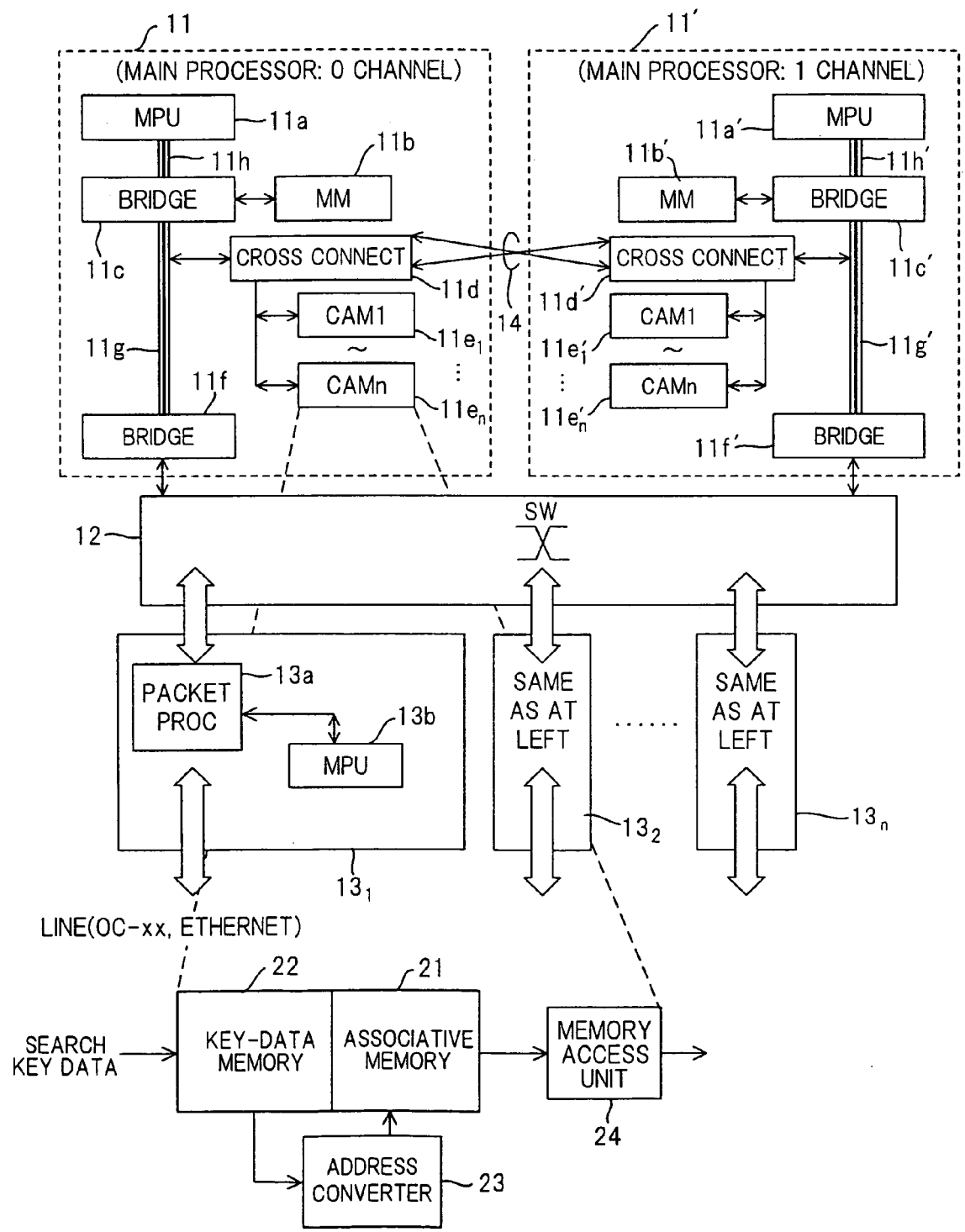
FIG. 1 is a block diagram showing the configuration of a system according to the present invention.

FIG. 1 is a block diagram showing the configuration of a system according to the present invention. The system includes identically constructed main controllers (main controllers of 0 and 1 channels) 11, 11' that are redundant in order to improve reliability; a switch 12; and line cards (line interfaces) $13_1 \sim 13_n$ that accommodate various lines such as SONET/SDH and Ethernet lines, etc.

The main controllers 11, 11' respectively include: (1) main processors (MPU) 11a, 11a'; (2) main memories (MM) 11b, 11b'; (3) MPU bus conversion bridges 11c, 11c' for connecting various devices such as input/output units and CAMs, which are connected to a system bus, to the MPU; (4) cross-connect units 11d, 11d' for communicating with the CAMs of the other channel; (5) pluralities of CAMs $11e_1 \sim 11e_n$, $11e_1' \sim 11e_n'$ provided for corresponding ones of line speeds and selectable depending upon line speed; and (6) bus conversion bridges 11f, 11f' for accepting data addressed to this router that arrives from each of the line cards via the switch. Accessing of the CAMs from the line cards and MPUs is performed via system buses 11g, 11g'. The MPU buses are indicated at 11h and 11h'.

Each of the CAMs $11e_1 \sim 11e_n$, $11e_1' \sim 11e_n'$ has: (1) an associative memory 21 for storing routing data; (2) a key-data memory 22 for storing key data conforming to destination addresses; (3) an address converter 23 which, when key data (search key data) conforming to a destination address DA requested from a line card exists in the key-data memory 22, converts this key data to an address of the associative memory 21; and (4) a memory access unit 24 for reading routing data out of the associative memory 21 from the above-mentioned address. Though the CAMs $11e_1 \sim 11e_n$, $11e_1' \sim 11e_n'$ are illustrated in block form as being identical in construction, their access speeds differ depending upon the process of manufacture; the larger the suffix number, the higher the speed at which the CAM can be accessed.

The line cards $13_1 \sim 13_n$ each have a packet processor 13a and a microprocessor (MPU) 13b for configuring the line card internally. The packet processor 13a (1) extracts the destination address DA of a packet that arrives from each line and sends this destination address DA to the CAMs of the main controllers 11, 11' via the switch 12 as key data (search key data) for searching routing data; (2) adds routing data (highway number HW-No.), which is acquired from the main controllers 11, 11' via the switch 12 onto the packet and sends the packet to the switch 12; and (3) removes routing data from a packet switched and input thereto and sends the packet to a line. In order to make it possible to distinguish between search key data and a packet, the packet processor 13a adds a key flag onto search key data and adds a data flag onto a packet and then sends the search key data or packet to the switch 12.

The switch 12 (1) sends the main controller 11 search key data, with the key flag attached thereto, that enters from the prescribed line cards $13_1 \sim 13_n$; (2) sends routing data obtained from the CAMs of the main controller 11 to the line card that is the requesting source, and (3) switches a packet, to which the data flag has been attached, based upon routing data, thereby sending the packet to another line interface.

The routing apparatus shown in FIG. 1 has the following features:

1) CAM Mounting Position

CAMs disposed in both the individual line cards and main controller in the prior art are consolidated on the side of the main controller 11, and the requesting of routing data and sending/receiving of retrieved routing data are carried out by an in-band scheme over a path between the packet processor 13a and switch 12. Further, routing tables (key data and associative data) are managed centrally by the CAMs of the main controller 11, and key data managed redundantly by each of the line cards in the prior art is eliminated. As a result, the number of CAMs used in the overall system can be reduced and it is possible to lower cost and to raise mounting efficiency. Since CAMs need only be provided in the main controller 11 alone, system start-up time can be shortened when the system is supplied with power and when the system recovers from failure.

2) CAM LSI Redundancy

In order to improve reliability at the occurrence of a failure in this arrangement where the CAMs are consolidated in the main controller 11, a CAM-dedicated cross-connect bus 14 is provided between the main controllers 11, 11' of the 0 and 1 channels, respectively, the routing tables possessed by the CAMs of both channels are made to coincide via the cross-connect bus 14 and, when a CAM of the working channel fails, recovery is made possible by a CAM of the standby channel.

3) Introduction of CAMs for Supporting Line Speeds

The smaller the latency of a CAM, i.e., the shorter its access time, the higher the price of the CAM. This means that overall cost rises with an arrangement in which only one high-speed supporting variety of CAM is used. The routing apparatus according to the present invention is such that the main controller 11 is provided with multiple CAMs $11e_1 \sim 11e_n$ for corresponding ones of line speeds; the CAMs used are decided depending upon the line speeds. As a result, the number of CAMs and the types of CAMs are optimized to exploit CAM resources effectively and to lower router cost.

Ordinarily, the minimum time necessary for a CAM search on a pre-line basis is the packet transmission time. More specifically, it is necessary to complete the CAM search during the transmission of one packet; the higher the line speed and the greater the number of data items transferred, the less time is available. FIGS. 2A, 2B are tables illustrating examples of minimum times for CAM searches of POS lines, in which FIG. 2A is the case for OC-12C and FIG. 2B the case for OC-192C.

Since transfer time per byte in case of OC-12C is 1.6 ns, total transfer time is $$1.6 \times (IP \text{ data fluctuation } n + PPP + \text{fixed part of } IP \text{ header})$$

If it is assumed that IP data fluctuation is 1 to 1500 bytes, then transfer time will be 0.36 μs to 19.64 μs. In case of OC-192C, on the other hand, transfer time per byte is 0.1 ns and therefore the total transfer time is 0.1×(*IP* data fluctuation *n*+*PPP*+fixed part of *IP* header)

If it is assumed that IP data fluctuation is 1 to 1500 bytes, then transfer time will be 0.02 μs to 1.23 μs. Because a CAM search must be completed during the transmission of one packet, a costly high-speed accessible CAM is used if line speed is high and a low-cost low-speed accessible CAM is used if line speed is low.

(B) Processing for Sending/Receiving Data Between Packet Processor and CAM

Figure 3:
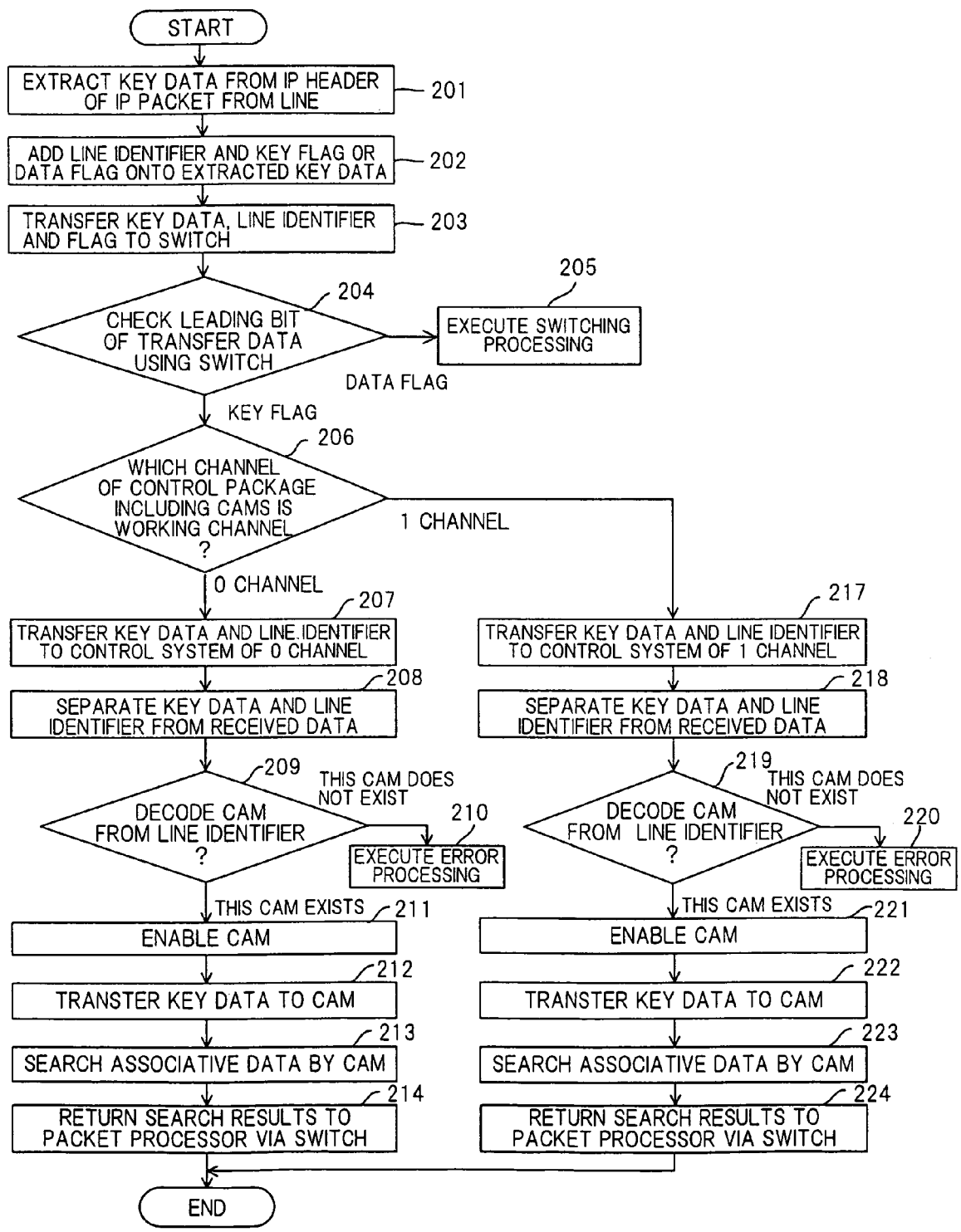
FIG. 3 is a processing flowchart showing the interaction between a CAM and packet processor for the purpose of acquiring associative data.
Figure 4B:
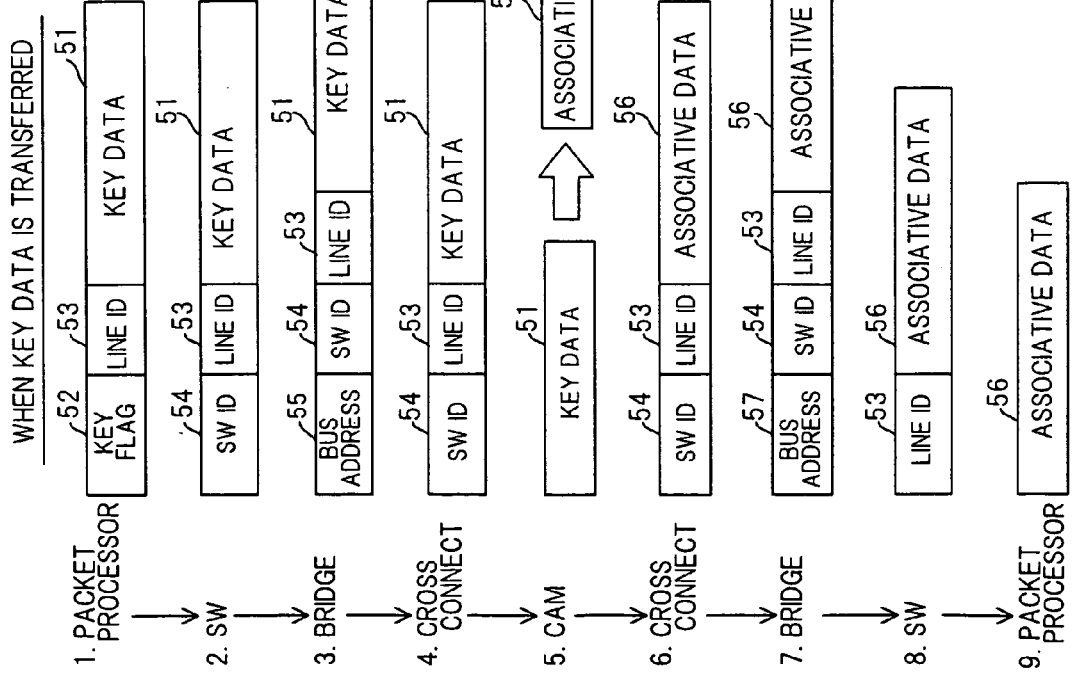
FIGS. 4A, 4B illustrate the format of data sent and received between a CAM and packet processor.
Figure 4A:
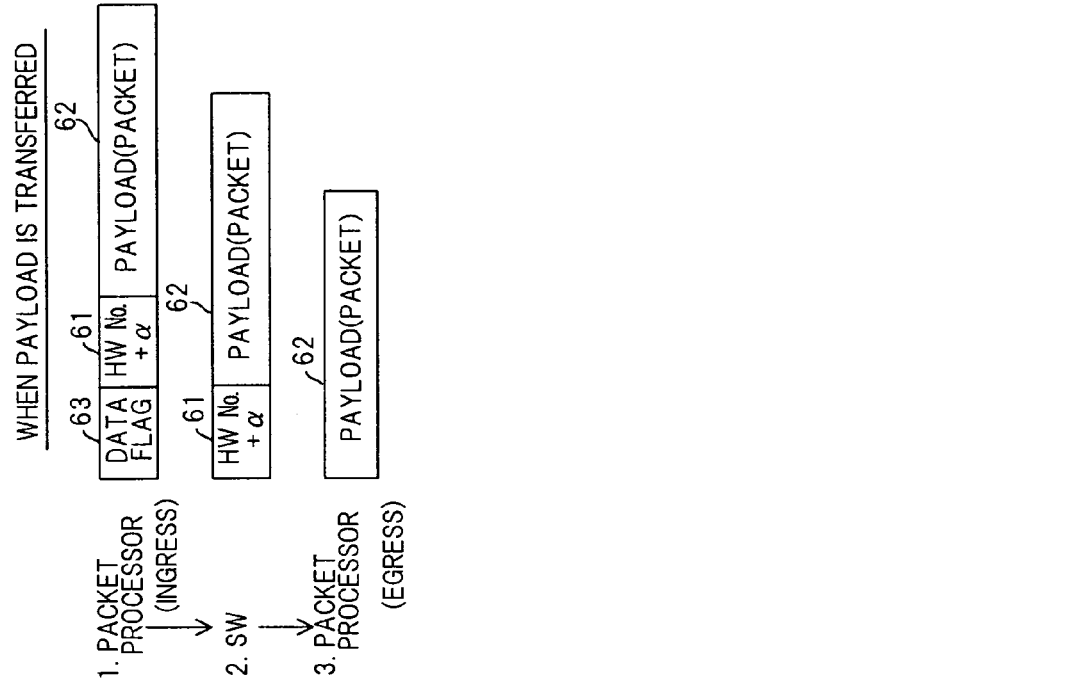

FIG. 3 is a flowchart of processing for sending/receiving data between a packet processor and CAM in order for a line card to acquire associative data (routing data), FIGS. 4A, 4b illustrate the data format of data sent and received between the packet processor and CAM, and FIG. 5 is a time chart illustrating timing at which data is sent and received between the packet processor and CAM.

The packet processor 13a of line card 13 conducts a search for a destination address DA from the IP header of an IP packet that has been received from a line and extracts the destination address DA as search key data 51 (see FIG. 4A) (step 201). Next, the packet processor 13a adds a key flag 52 onto the search key data 51 in order that the switch 12 can recognize this data as being search key data, adds on a line identifier (Line ID) 53 of the line on which the IP packet arrived in order that the main controller can recognize the line speed of this line (step 202), and inputs the search key data to the switch 12 (step 203).

The switch 12 refers to the leading bit (flag) of the received transfer data (step 204). If the leading bit is a data flag, the switch 12 determines that the transfer data is a packet and switches the packet to the prescribed line card based upon the routing data (step 205).

If the leading bit of the received transfer data is a key flag, the switch 12 determines which of the main controllers 11, 11' of the 0, 1 channels is working (step 206), deletes the flag and sends the line identifier 53 and search key data 51 to the working main controller. For example, if the main controller 11 of the 0 channel is working, the switch 12 deletes the flag and sends the line identifier and the search key data to the bus bridge 11f of the main controller 11. In a case where redundant switches are provided, the switch 12 adds a switch identifier SW ID 54, which specifies the switch that is the source of the transfer, onto the key data.

The bus bridge 11f adds a bus address 55 of the destination (i.e., the cross-connect unit) onto the received data and transfers the data to the cross-connect unit 11d via the system bus 11g (step 207).

The cross-connect unit 11d separates the search key data 51 and line identifier 53 from the received data (step 208), decodes the CAM used from the line identifier 53 and determines whether this CAM exists (step 209). That is, line speed is obtained based upon the line identifier 53, the CAM corresponding to this line speed is found and it is determined whether this CAM has been mounted on the main controller 11. If the CAM has not been mounted on the main controller 11, error processing is executed (step 210). If the CAM has been mounted on the main controller 11, then the CAM is enabled so that it can be accessed (step 211). Next, the cross-connect unit 11d transfers the search key data 51 to this CAM (step 212). On the basis of the search key data 51, the CAM searches associative data (routing data) 56 (step 213) and sends the associative data back to the cross-connect unit 11d.

The cross-connect unit 11d adds the original line identifier 53 and switch identifier 54 onto the associative data 56, adds on the bus address 57 of the destination (the bus bridge 11f) and sends the data to the system bus 11g. The bus bridge 11f deletes the bus address 57 and switch identifier 54 from the received data and inputs the line identifier 53 and switch identifier 54 to the switch 12 that is identified by the switch identifier. The switch 12 deletes the line identifier 53 and inputs the associative data 56 to the packet processor 13a of the prescribed line card (step 214).

The foregoing is for a case where the main controller 11 of the 0 channel is found to be working at step 206. If the main controller 11' of the 1 channel is found to be working, however, then the main controller 11' executes processing, which is similar to the processing of steps 207 to 214 performed by the main controller 11 of the 0 channel, at steps 217 to 224.

(b) Switching of Ordinary Packets

If the packet processor 13a receives associative data, the processor extracts the routing data (highway number HW No.) and other information, adds this information (HW No. and other information) 61 onto an IP packet (payload) 62 and inputs the packet to the switch 12 (see FIG. 4B). The packet processor 13a adds a data flag (Data Flag) 63, which indicates that a series of transfer data is an ordinary packet that is to be switched, onto the leading bit (steps 202, 203).

The switch 12 refers to the leading bit (flag) of the received transfer data (step 204). If the leading bit is a data flag, the switch 12 determines that the transfer data is a packet, removes the flag and switches the packet to the prescribed line card based upon the routing data 61 (step 205). If this line card receives a packet from the switch 12, it deletes the routing data, maps the packet to the SONET/SDH payload and sends the payload to the line.

The time chart of FIG. 5 illustrates time plotted along the horizontal axis. The routing apparatus of the present invention is such that CAMs are accessed by an in-band method via the switch 12 and system bus 11g. This means that some time is needed to obtain routing data. However, owing to improvements in system bus speed and switch operating speed, actual access time can be shortened and operation is possible with an access time that compares favorably with that of the conventional routing apparatus.

(C) Mixed Mounting of Different Types of Lines on Line Cards

Figure 6:
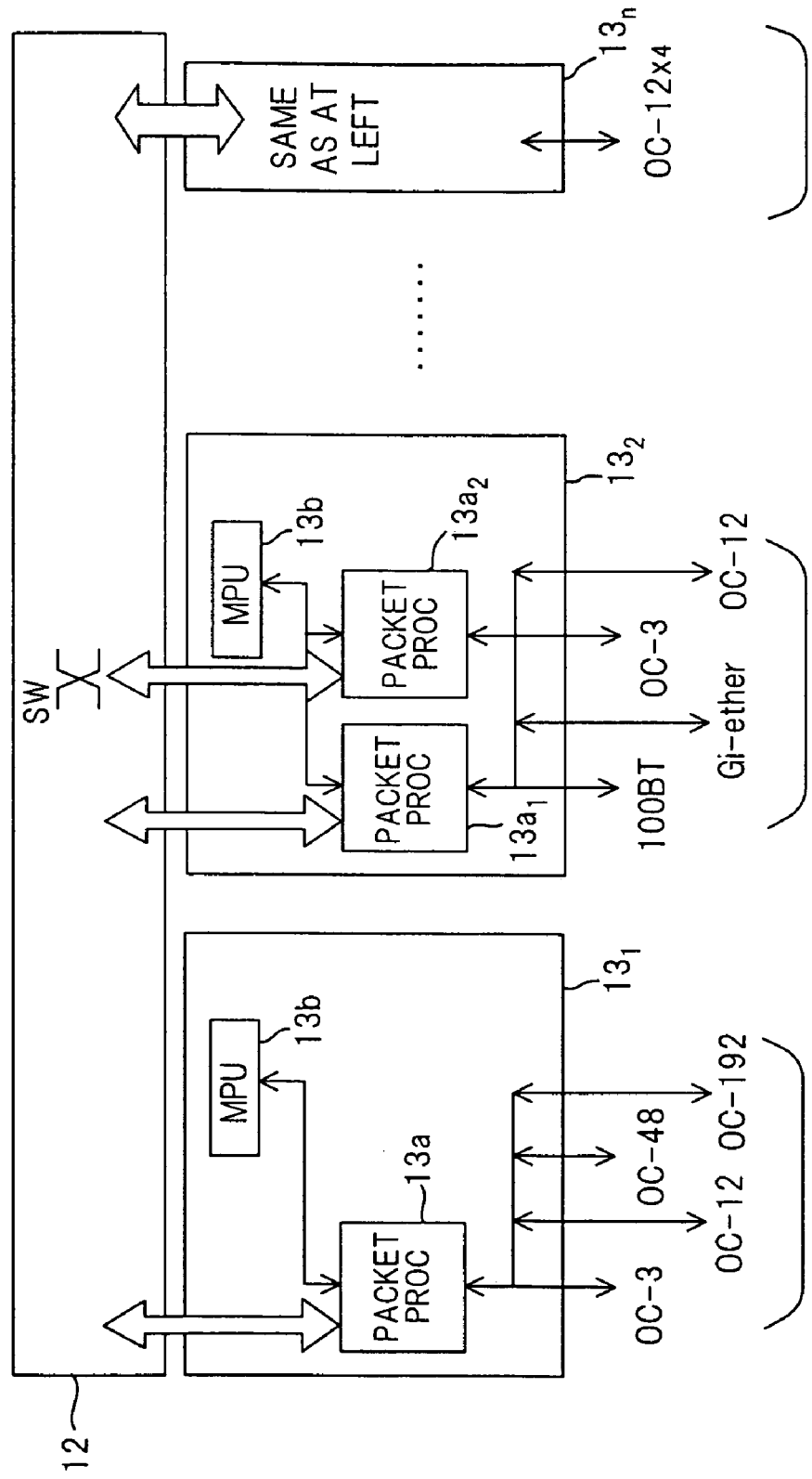
FIG. 6 is a diagram useful in describing mixed mounting of a plurality of different types of lines on a line card.

The description rendered in conjunction with FIG. 1 assumes that the line cards $13_1$~$13_n$ are identical in construction. However, line cards may be provided with multiple packet processors and the lines accommodated may be of any speed. FIG. 6 is a diagram useful in describing the mixed mounting of lines of different types. Here one packet processor 13a and one MPU 13b are mounted on the line card $13_1$, and the line card $13_1$ accommodates lines of four different speeds, namely OC-3, OC-12, OC-48 and OC-192 lines; two packet processors 13a1, 13a2 and one MPU 13b are mounted on the line card $13_2$, and the line card $13_2$ accommodates lines of four different speeds, namely OC-3, OC-12, 100BT and Gi-Ether lines; and four identical lines, namely four OC-12 lines, are mounted on the line card $13_n$.

The routing apparatus of the present invention is such that the main controller 11 is equipped with CAMs $11e_1$~$11e_n$ associated with respective ones of line speeds. If the main controller 11 receives search key data with attached line identifiers from the line cards $13_1$~$13_n$, the main controller 11 obtains routing data from the CAMs that correspond to the line speeds and sends the routing data to the line cards that were the source of the request. As a result, it is possible for CAMs having different speeds to be used properly for every line speed. Moreover, it is possible for each of the line cards $13_1 \sim 13_n$ to accommodate lines having various speeds, as illustrated in FIG. 6. In other words, the routing apparatus of the present invention is capable of employing inexpensive, low-speed CAMs, the line accommodating efficiency of the line cards can be raised and cost can be reduced.

(D) Circuits Peripheral to CAMs

Figure 7:
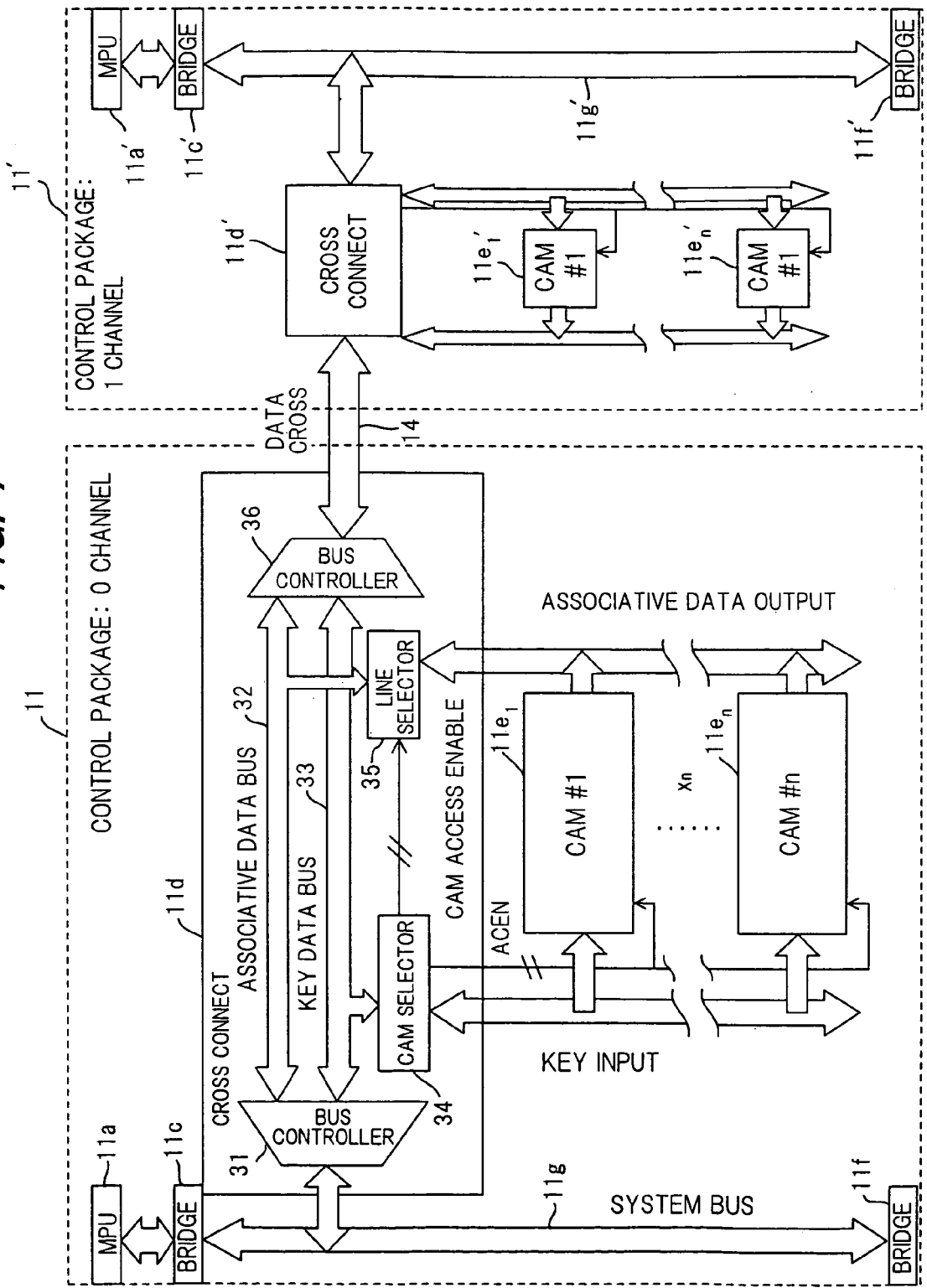
FIG. 7 is a block diagram of circuits peripheral to CAMs.

FIG. 7 is a block diagram of the circuits that are peripheral to the CAMs. Components in FIG. 7 identical with those shown in FIG. 1 are designated by like reference characters. A bus controller 31 within the cross-connect unit 11d controls path arbitration between the system bus 11g and an associative data bus 32 and key data bus 32. The associative data bus 32 is provided in the cross-connect unit 11d and transmits associative data and the like read out of the associative memory 21 (see FIG. 1) that constructs each of the CAMs $11e_1 \sim 11e_n$. A key data bus 33 is provided in the cross-connect unit 11d and transmits key data/associative data or key data (key search data) for searching routing data written to the key-data memory 22 or associative memory 21 constructing each CAM. More specifically, the bus controller 31 sends the key data bus 33 a routing table (key data/associative data), which enters from the main processor 11a via the system bus 11g, and writes the routing table to the prescribed CAM. When a search of routing data is conducted, the bus controller 31 sends the key data bus 33 search key data that enters from a line card via the system bus 11g. The bus controller 31 further sends associative data and the like, which has been read out of a CAM, to the system bus 11g via the associative data bus 32.

Figures 8, 11:
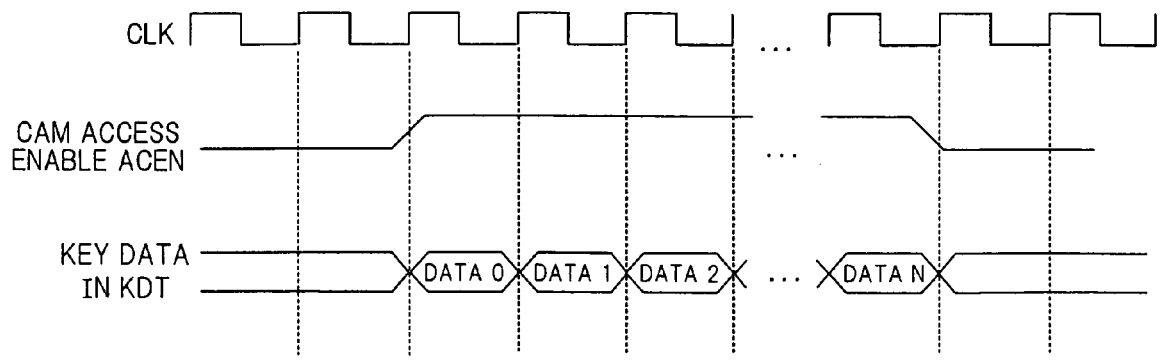
FIG. 8 is a time chart of CAM access.
FIG. 11 is a table showing the relationship among RAM cell width, key data width, associative data width and entry count.

A CAM selector 34 separates (1) key data 51, (2) a line identifier 53 and (3) a switch identifier (SW ID) from data (see FIG. 4A) received from the line cards $13_1 \sim 13_n$ by the in-band method, sends the key data to the prescribed CAM, holds the line identifier and switch identifier and inputs these to a line selector 35, described later. On the basis of the line identifier 53, the CAM selector 34 selects the CAM to be accessed and sends an access-enable signal ACEN to the CAM via the control line. FIG. 8 is a time chart of CAM access when routing data is searched. The CAM selector 34 raises the access-enable signal ACEN to the high level in sync with a clock and thenceforth sends key data KDT to the CAM in sync with the clock.

The line selector 35 adds the line identifier 53 and switch identifier 54, which enter from the CAM selector 34, onto the associative data retrieved from the prescribed CAM and sends the associative data to the associative data bus 32.

A bus controller 36 performs bus arbitration control between the cross-connect bus 14 and the associative data bus 32 and key data bus 33. When the main processor 11a of the main controller 11 of the working channel updates the routing tables within the CAMs $11e_1 \sim 11e_n$ or writes routing tables to these CAMs $11e_1 \sim 11e_n$ anew, the main processor 11a updates and writes the routing tables in the CAMs $11e_1' \sim 11e_n'$ within the main controller 11' of the standby channel as well. In such case the bus controller 36 performs bus arbitration control and sends the routing tables from the main processor 11a to the main controller 11' of the standby channel via the cross-connect bus 14.

Figure 9:
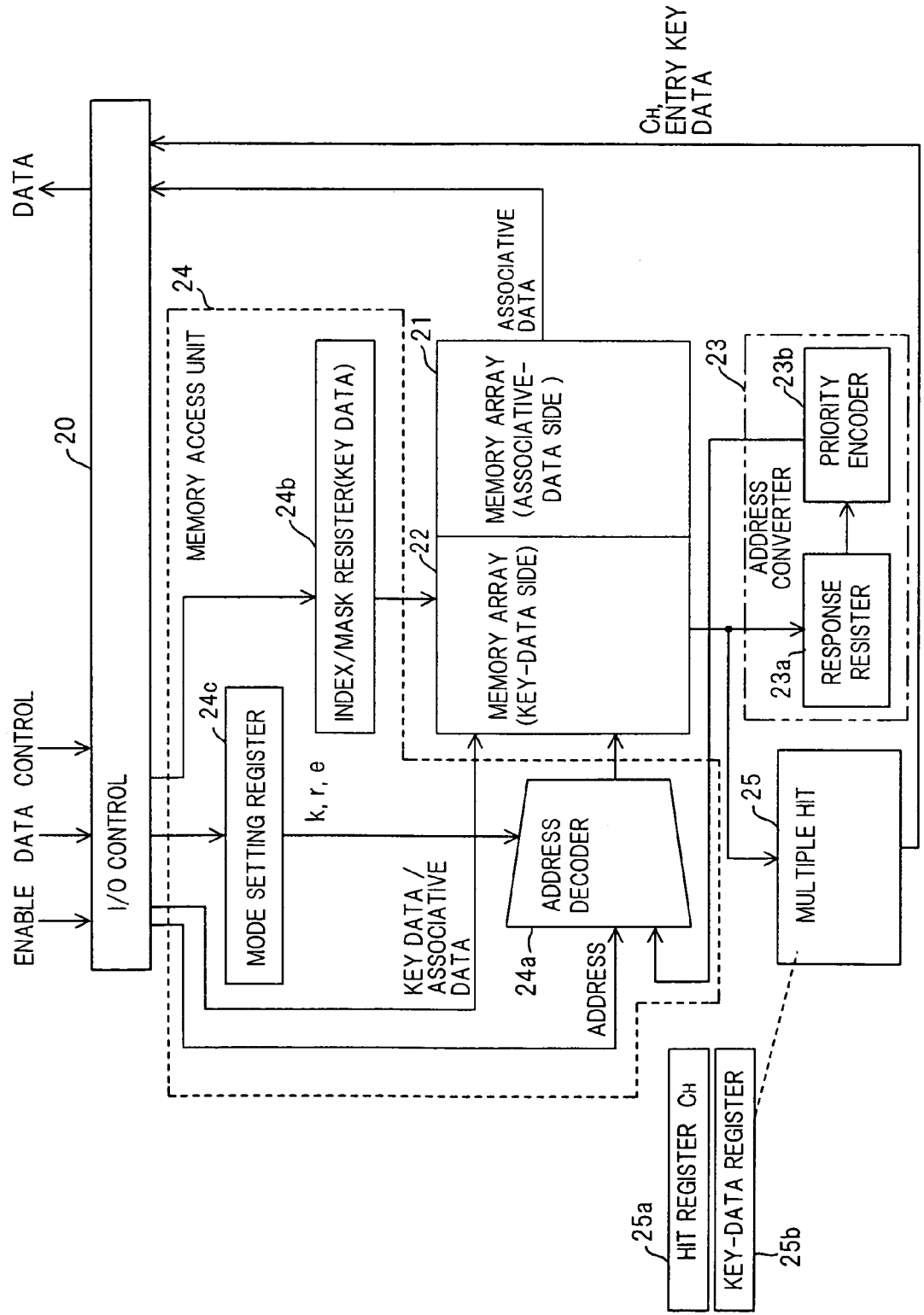
FIG. 9 is a block diagram showing the internal structure of a CAM.

FIG. 9 is a block diagram showing the internal structure of a CAM. Components in FIG. 9 identical with those shown in FIG. 1 are designated by like reference characters. An input/output controller 20 controls input/output of key data and associative data. Various data (key data, associative data and search key data), control signals and an enable signal enter the input/output controller 20 from the cross-connect side, and the input/output controller 20 outputs associative data and multiple-hit associative data, etc., to the cross-connect side.

The associative memory 21 stores associative data (routing data HW-No. and other information), and the key-data memory 22 stores key data conforming to destination addresses. The associative memory 21 and key-data memory 22 are constituted by contiguous areas of a single memory array. Bit width r of the associative data, bit width k of the key data and the boundary between these areas can be set and changed programmably.

When key data (search key data) conforming to a destination address DA requested from a line card exists in the key-data memory 22, the address converter 23 converts this key data to an address of the associative memory 21. The address converter 23 has a response register 23a and a priority encoder 23b. The response register 23a stores (1) the result of performing matching (comparison) between entry key data, which has been stored in the key-data memory 22, and search key data or (2) the result of performing matching between entry key data, which has been stored in the key-data memory 22, and the non-masked portion of the search key data. The priority encoder 23b generates an address of the associative memory 21 based upon the result of matching from the response register 23a and outputs associative data (routing data HW-No. and other information) from this address of the associative memory 21. In a case where multiple items of key data that have been stored in the key-data memory 22 match the search key data (multiple hits), the priority encoder 23b generates an address conforming to one item of entry key data decided based upon a predetermined criterion. The apparatus tries to send a packet based upon the associative data read out of this address. If the packet does not arrive at the destination, an address conforming to the next item of entry key data is output in response to a request. Addresses are thenceforth output sequentially in the same fashion.

The memory access unit 24, which controls writing of key data/associative data to the memory array and controls read-out of associative data conforming to search key data, has an address decoder 24a, an index/mask register 24b and a mode setting register 24c. The address decoder 24a decodes address data input thereto, writes key data/associative data to a prescribed address of the memory array (this is when routing table updating is performed) or reads key data/associative data out of a prescribed address of the memory array (this is when a routing data search is conducted). The index/mask register 24b stores search key data (destination address) and mask data. The mode setting register 24c holds the bit width k of key data, the bit width r of associative data and the entry count e. The entry count e is the number of items of key data that can be stored in the memory array (it is equal to the number of items of associative data). The address decoder 24a generates addresses in the key-data area 22 and associative data area 21 conforming to the address data on the basis of k, r and e and controls read/write of the key data and associative data. By thus internally providing the CAM LSI with a RAM-based associative memory that is disposed externally of the CAM LSI chip in the prior art, the memory array can be exploited effectively. In addition, even if the width of key data or the width of associative data is changed, this can be dealt with by changing only the configuration data in the mode setting register 24c.

When multiple items of key data that have been stored in the key-data memory 22 match the search key data (i.e., when there are multiple hits), a multiple-hit management unit 25 stores the hit count $C_H$ in a hit register 25a, stores the entry key data that matches the search key data in a key data register 25b and sends the hit count $C_H$ and the set of entry key data to the main processor 11a via the input/output controller 20. Since the multiple-hit management unit 25 thus manages the hit count and entry key data, the main processor 11a need only read out the management data as necessary and execute prescribed processing, as a result of which processing by the main processor at the time of multiple hits can be reduced. It should be noted that processing for detecting errors in key data that has been stored in the key-data memory 22 is an example of the processing executed by the main processor.

(F) Memory Array and Peripheral Circuits

Figure 10:
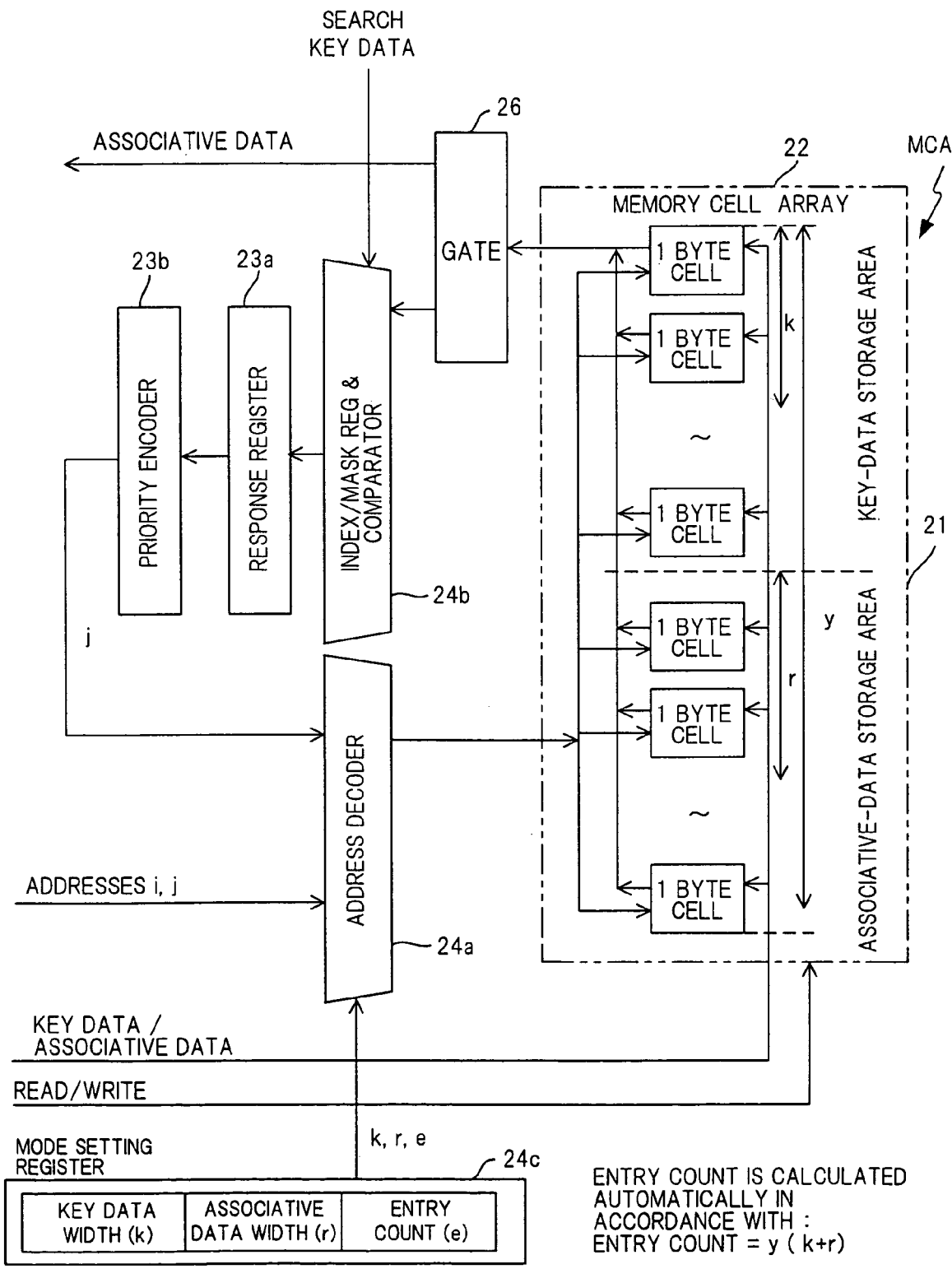
FIG. 10 is a block diagram showing the structure of a memory array and circuits peripheral thereto.

FIG. 10 is a block diagram showing the structure of the memory array and circuits peripheral thereto. Components in FIG. 10 identical with those shown in FIG. 9 are designated by like reference characters. The first half of a RAM-based memory array MCA constitutes the key-data storage area 22 and the second half constitutes the associative memory area 21. Since the number e of items of key data and number e of items of associative data (i.e., the entry count e) that can be registered in the memory array are equal, e is obtained in accordance with the following equation:

$$e = y/(k+r) \quad (1)$$

where y represents the total number of single-byte cells of the memory array MCA, the width of the key data is k bytes and the width of the associative data inclusive of routing data is r bytes, and k, r, e are set in the mode setting register 24c. FIG. 11 is a table showing the relationship among the 1-byte cell count y in the memory array, key data width k, associative data width r and entry count e. The entry count e is decided by Equation (1). The left column indicates the relationship among y, k, r and e in a case where the cell byte count of the memory array is 1000, and the right column indicates the relationship among y, k, r and e in a case where the cell byte count of the memory array is 16,384.

Cell byte addresses that correspond to the ith key data address of the key-data memory 22 are given by the following:

$$i \cdot k \sim i \cdot k + (k-1) \quad (2)$$

based upon k, r and e. The cell byte addresses that correspond to the jth associative data address of the associative memory 21 are given by the following:

$$k \cdot e + j \cdot r \sim k \cdot e + j \cdot r + (r-1) \quad (3)$$

The address decoder 24a refers to k, r, e that have been set in the mode setting register 24c and converts the address data, which is input thereto, to byte addresses of the memory array MCA based upon Equations (2) and (3).

Writing of Key Data

When key data is to be written to the memory array MCA, the key data is input to the memory array MCA. If a key-data write address i is input to the address decoder 24a, the latter decodes the address data i in accordance with Equation (2) and writes the key data to k-number of 1-byte cells indicated by the address obtained by decoding. Key data is thenceforth written successively to the key-data storage area 22 in similar fashion.

Writing of Associative Data

When associative data is to be written to the memory array MCA, the associative data is input to the memory array MCA. If an associative-data write address j is input to the address decoder 24a, the latter decodes the address data j in accordance with Equation (3) and writes the associative data to renumber of 1-byte cells indicated by the addresses obtained by decoding. Associative data is thenceforth written successively to the associative memory area 21 in similar fashion.

Read-Out of Associative Data Conforming to Search Key Data

In order to output associative data conforming to search key data (a destination address), the search key data is input to and stored in the index/mask register 24b and key-data read-out addresses i=1~e are input successively to the address decoder 24a. The latter decodes the address data i in accordance with Equation (2), reads k bytes of key data (entry key data) out of k-number of byte cells indicated by the byte addresses decoded and inputs the key data to the index/mask register 24b via a gate 26. The index/mask register 24b uses its comparison function to compare the search key data and entry key data and stores the results of comparison in the response register 23a. Thereafter, and in similar fashion, the address data i is incremented and the results of comparing the search key data and the entry key data read from key data addresses indicated by i=1~e are stored in the response register 23a. When the comparison processing ends, the priority encoder 23b converts the entry key data that matches the search key data to an address j of the associative memory area 21 and inputs the address to the address decoder 24a. The latter decodes the associative data address j, which is input thereto, in accordance with Equation (3), reads r bytes of associative data out of renumber of byte cells indicated by the byte addresses obtained by decoding and outputs this associative data via the gate 26.

Thus, the routing apparatus of the present invention is such that when the bit widths of associative data and key data are changed, it will suffice merely to input the bit width r of the associative data and the bit width k of the key data after the change. The circuits peripheral to the CAMs need not be altered in design.

(G) Flow of Data Between Units (a) Flow of Data Between CAMs and MPU

Figure 12:
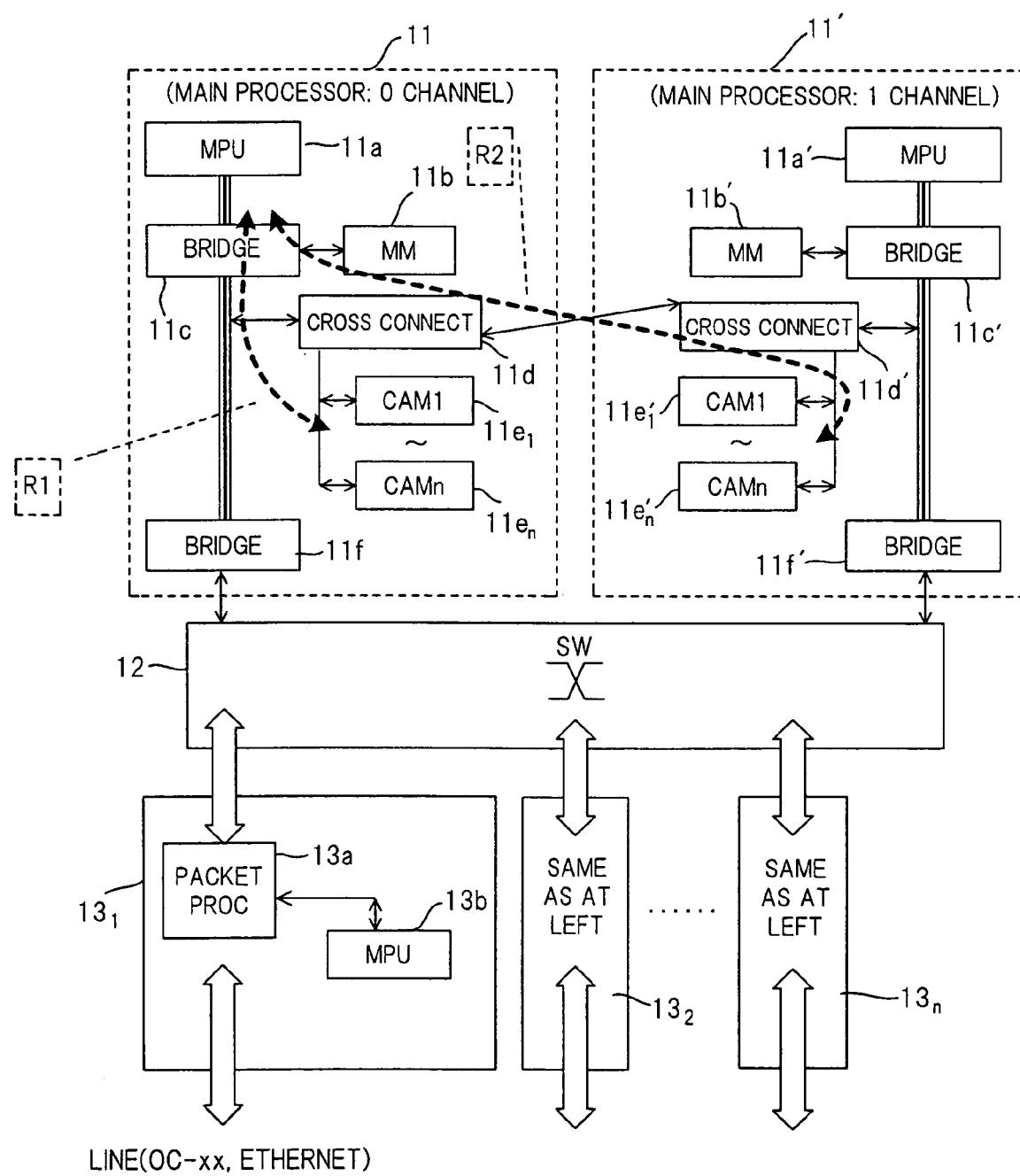
FIG. 12 is a diagram useful in describing the flow of data between CAMs and an MPU.

FIG. 12 is a diagram useful in describing the flow of data between CAMs and an MPU. The main processor (MPU) 11a of the main controller 11 of the working channel accesses the internal CAMs $11e_1$~$11e_n$ via a route R1. Accordingly, when the main processor 11a writes routing tables (key data/associative data) to the internal CAMs $11e_1$~$11e_n$, it does so via the route R1. When the main processor 11a reads associative data or the like out of the internal CAMs, it does so via the route R1. The main processor (MPU) 11a of the main controller 11 of the working channel accesses the internal CAMs $11e_1'$~$11e_n'$ of the standby main controller 11' via a route R2, which is shown in FIG. 12. Accordingly, when the main processor 11a writes routing tables to the CAMs $11e_1'$~$11e_n'$ in order to duplicate these routing tables, it does so via the route R2.

(a) Flow of Data Between CAMs and MPU

Figure 13:
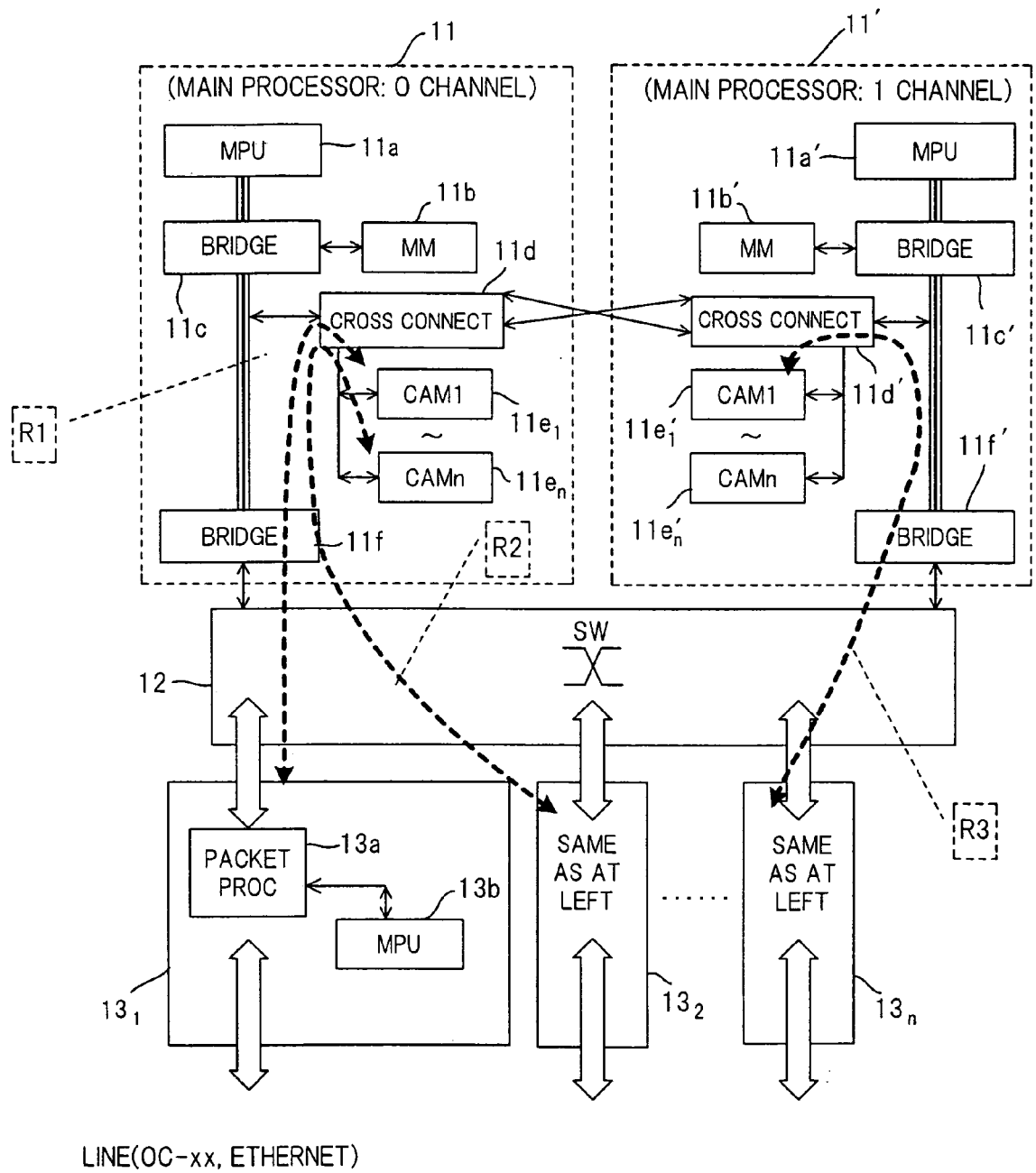
FIG. 13 is a diagram useful in describing the flow of data between CAMs and packet processors.

FIG. 13 is a diagram useful in describing the flow of data between CAMs and packet processors. The sending and receiving of data between the CAMs of the working channel and the packet processors of the line cards is carried out via routes R1 to R3. Route R1 is the route in a case where the line card 13, applies search key data to the CAM $11e_1$ of the working channel and receives the search results (routing data). Route R2 is the route in a case where the line card $13_2$ applies search key data to the CAM $11e_n$ of the working channel and receives the search results (routing data). Route R3 is the route in a case where the main controller 11' is the working channel and the line card $13_n$ applies search key data to the CAM $11e_1'$ of the working channel and receives the search results (routing data).

(c) Flow of Data Between CAMs and Packet Processor at Time of Failure

Figure 14:
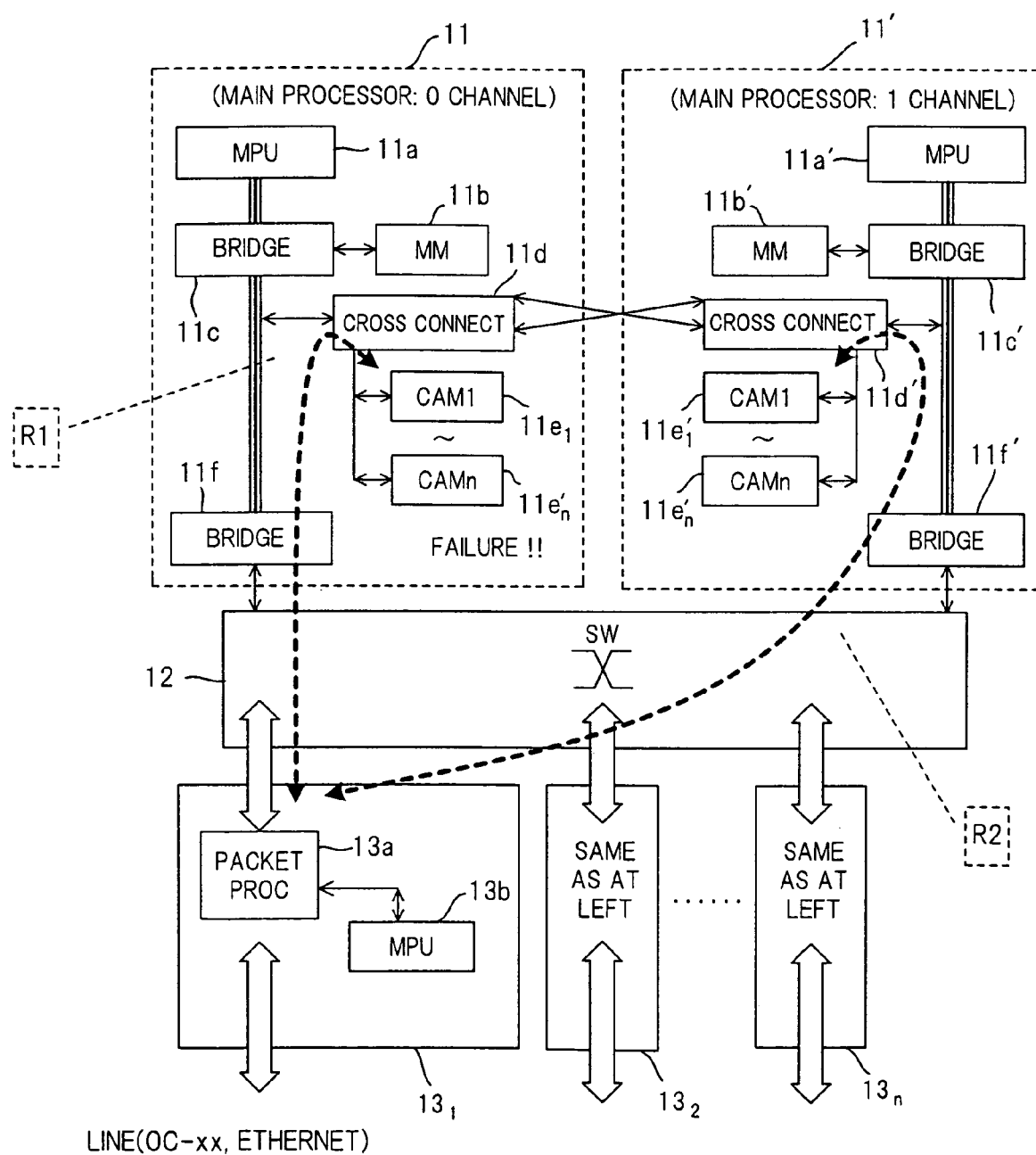
FIG. 14 is a diagram useful in describing the flow of data between CAMs and a packet processor at the time of failure.
Figure 15:
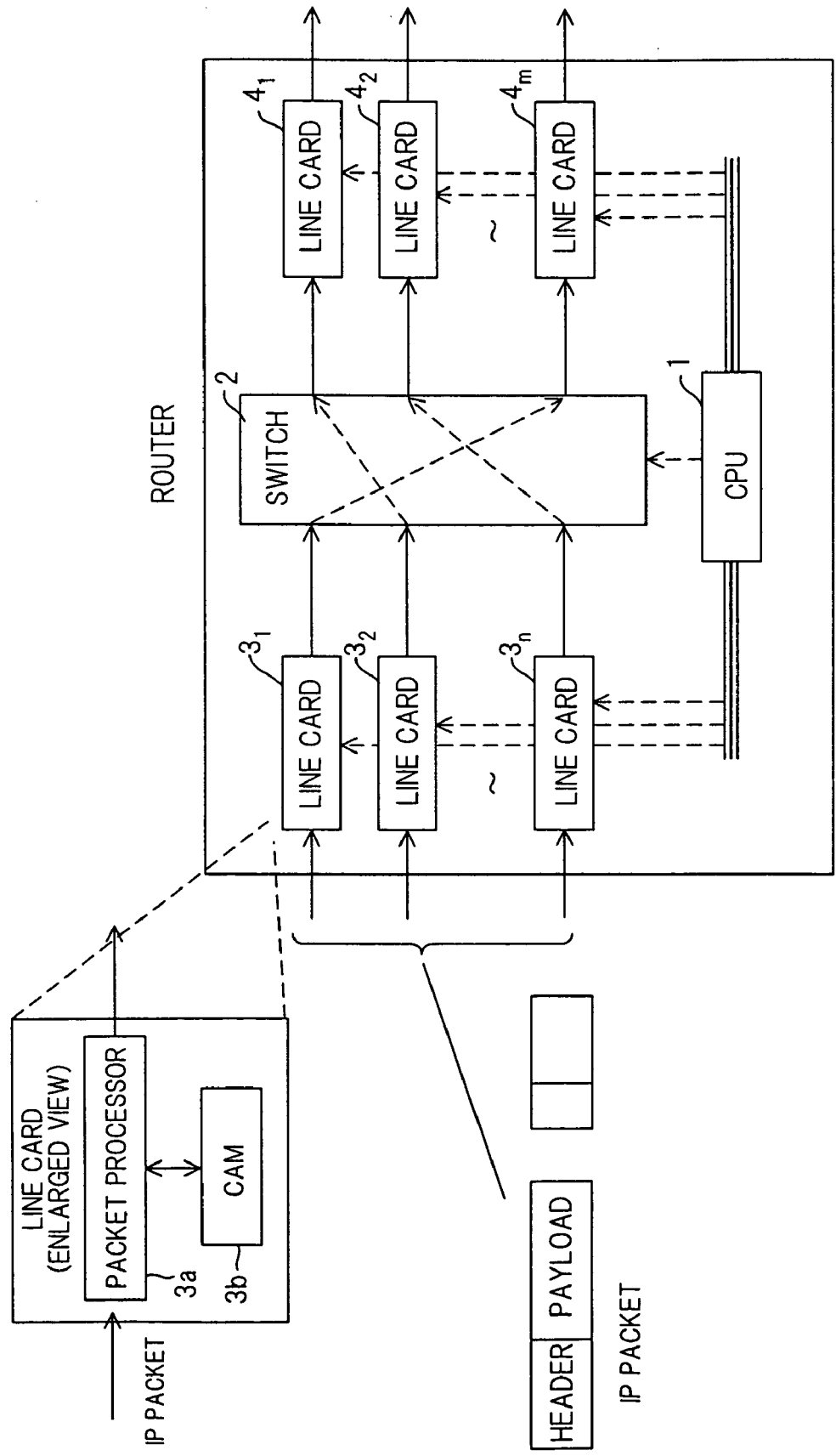
FIG. 15 is a block diagram illustrating the general structure of a router according to the prior art.
Figure 16:
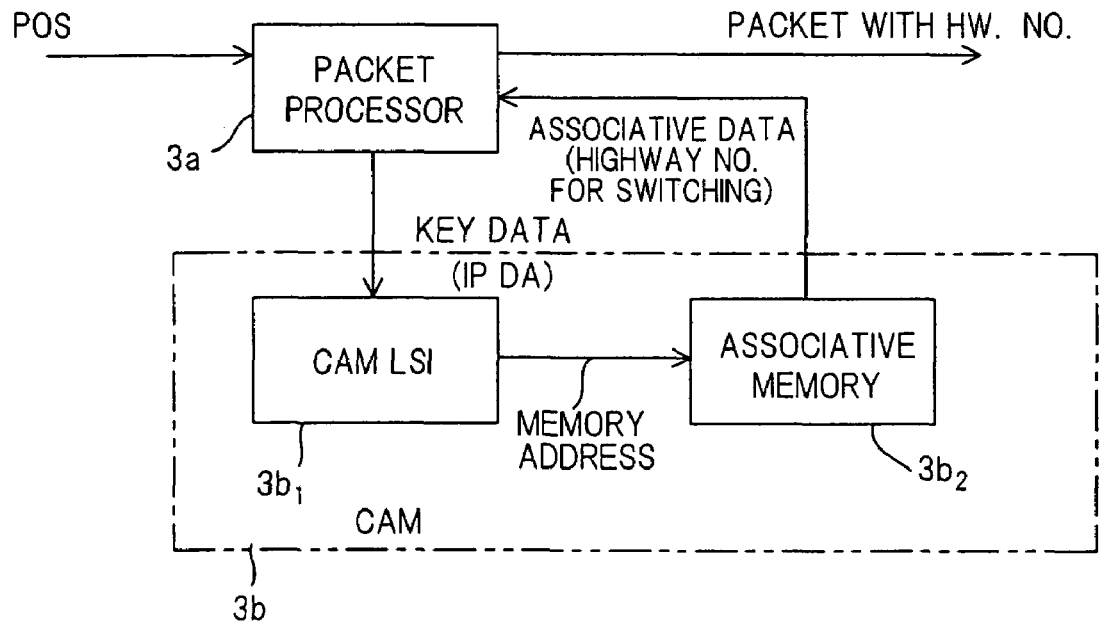
FIG. 16 is a block diagram of a line card according to the prior art.
Figure 17:
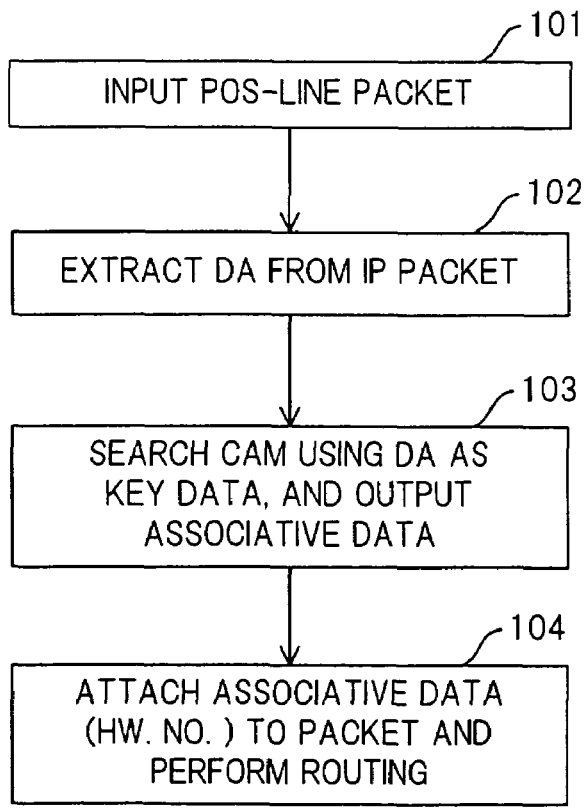
FIG. 17 is a flowchart of a CAM search according to the prior art.
Figure 18:
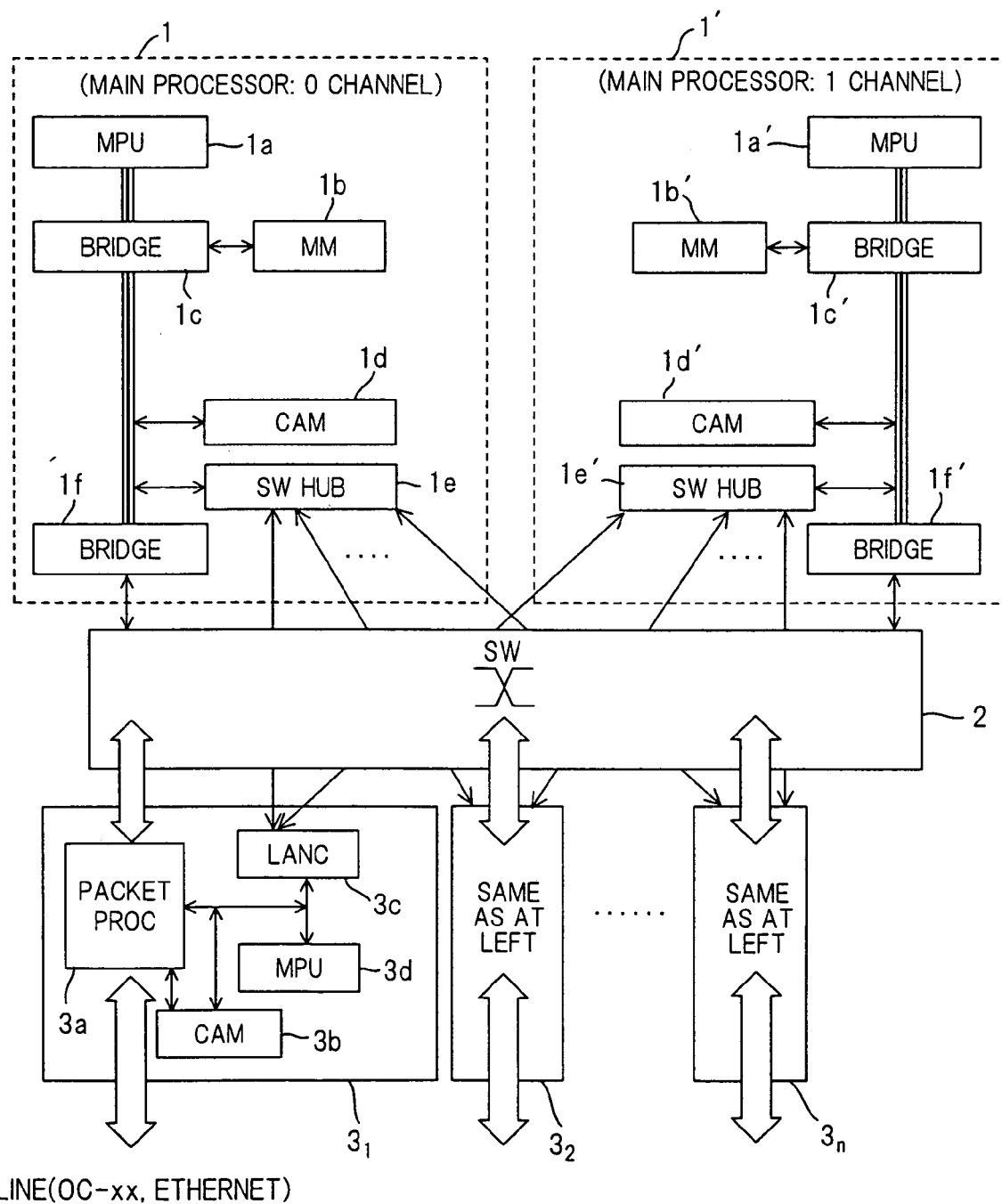
FIG. 18 is a block diagram showing the details of the router according to the prior art.
Figure 19:
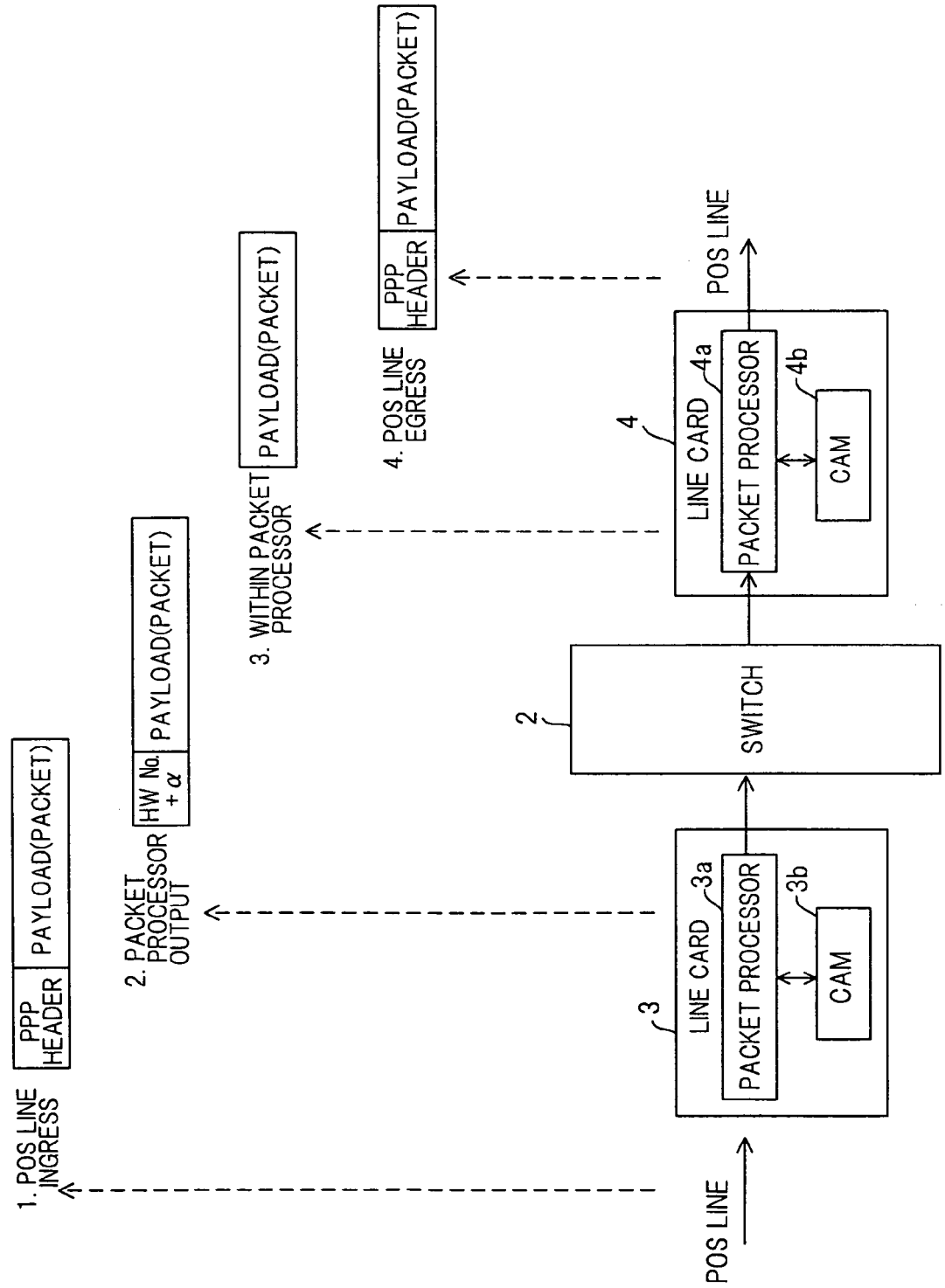
FIG. 19 is an explanatory view illustrating the flow of packets in the router according to the prior art.
Figure 20:
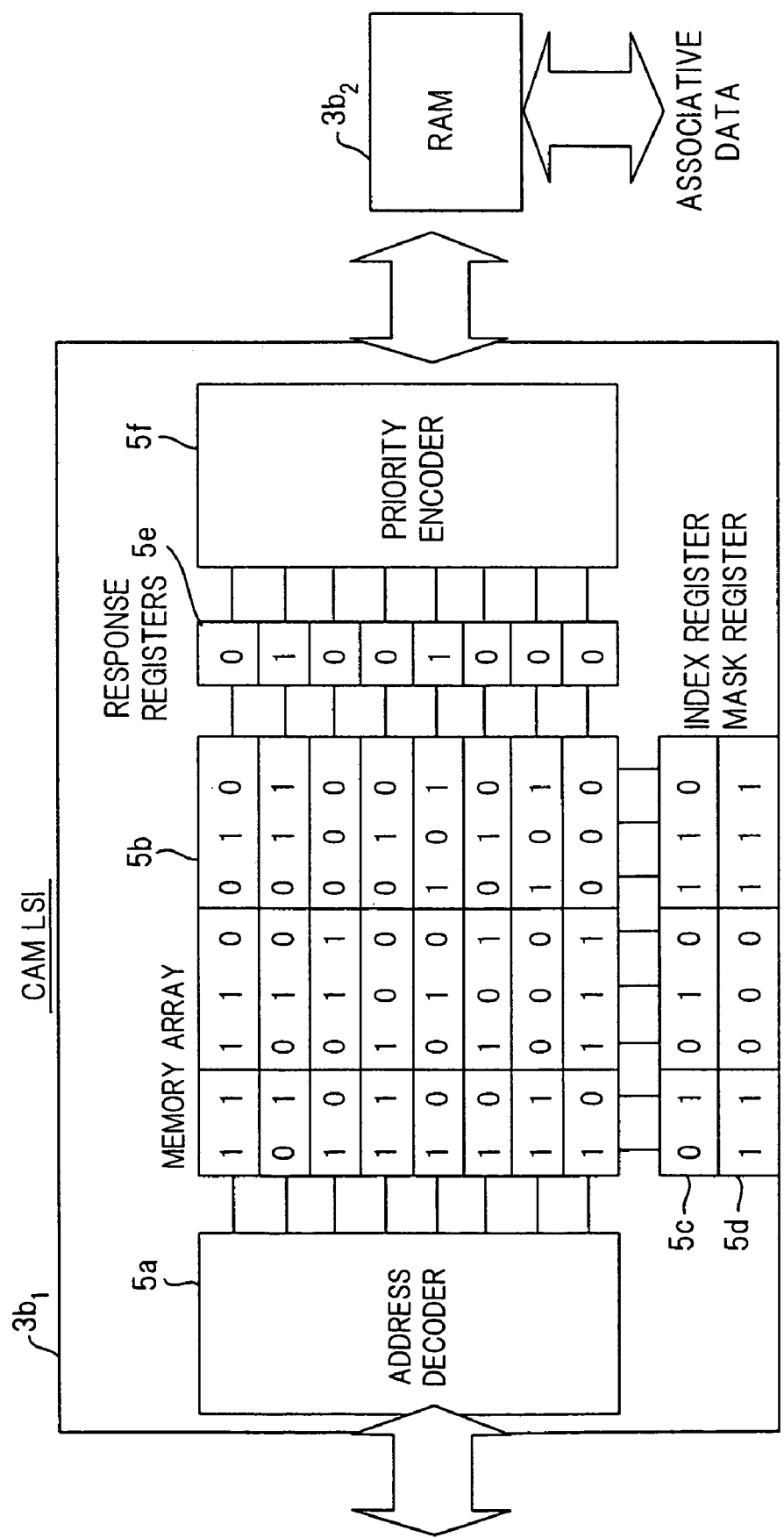
FIG. 20 is a diagram useful in describing the internal structure of a CAM LSI chip.

FIG. 14 is a diagram useful in describing the flow of data between CAMs and a packet processor at the time of failure. Prior to the occurrence of a failure, the packet processor $13a$ of the line card $13_1$ accesses the CAMs $11e_1 \sim 11e_n$ of the main controller 11 via the route R1 to obtain routing data. However, if the CAMs $11e_1 \sim 11e_n$ develop a failure and the main controller 11' becomes the operating channel, then the packet processor $13a$ acquires routing data by accessing the CAMs $11e_1' \sim 11e_n'$ of the main controller 11' of the operating system via the route R2.

Thus, in accordance with the present invention, CAMs (routing data generators) disposed in both the individual line cards and main controller in the prior art are consolidated on the side of the main controller to achieve centralized management of the routing tables. This makes it possible to reduce the number of CAMs used by the entire system, thereby lowering cost and raising mounting efficiency.

Further, in accordance with the present invention, CAMs need be provided only in the main controller. When the system is started up, therefore, it is unnecessary to transfer routing tables from the main processor of the main controller to the line cards. This makes it possible to shorten system start-up time when power is introduced and when the system recovers from failure.

Further, in accordance with the present invention, when a line interface issues a routing data request with an attached line identifier, the main controller obtains routing data from the CAM that corresponds to the line speed and sends this routing data to the line interface that is the requesting source. As a result, CAMs having different speeds can be used respectively for respective ones of the line speeds, inexpensive, low-speed CAMs can be used and it is possible for a line card to accommodate lines of various line speeds, enabling the line accommodating efficiency of line cards to improved. As a result, the routing apparatus can be lowered in cost.

Further, in accordance with the present invention, the main controller is provided in duplicate. When a working main controller updates the stored content (routing tables) of CAMs, the routing tables of the CAMs on the standby main controller also are updated. When the working main controller develops a failure, the standby main controller continues routing control by serving as the new working controller. As a result, it is possible to raise reliability at the time of a failure in a case where the CAMs consolidated in the main controller.

Further, in accordance with the present invention, the associative memory and the key-data memory are constituted by a single memory array, and contiguous first and second areas of the memory array are adopted as the associative memory area and key-data memory area, respectively. A memory access unit obtains an entry count e, which is the number of items of key data and the number of items of associative data that can be registered in the memory array, automatically from a total number y of single-byte cells of the memory array, width k of the key data and width r of the associative data, and performs read/write control for reading and writing the key data and associative data from and to the memory array based upon y, k, r and e. If this arrangement is adopted, control for varying the bit widths of the associative data and key data can be carried out merely by programmably changing y, k and r; the circuits peripheral to the CAMs need not be altered in design.

Further, in accordance with the present invention, the routing data generators of the main controller are made to manage the entry count (hit count) and entry key data of multiple hits. As a result, processing at the time of multiple hits can be executed within the CAM LSI chip. This makes it possible to reduce processing by the main processor and, hence, to alleviate the load on the main processor.

As many apparently widely different embodiments of the present invention can be made without departing from the spirit and scope thereof, it is to be understood that the invention is not limited to the specific embodiments thereof except as defined in the appended claims.

What is claimed is:

1. A routing apparatus for obtaining routing data conforming to a destination address of a packet that arrives from a line, adding the routing data onto the packet, and switching the packet based upon the routing data to send the packet to a prescribed line, comprising:

a main controller having a routing data generator for generating routing data conforming to a requested destination address and sending the routing data to a requesting source;

a line interface for extracting a destination address from a packet that arrives from a line, generating routing-data request for requesting said main controller to be notified of routing data conforming to this destination address, adding the routing data of which notification has been given by said main controller onto the packet and then outputting the packet;

a switch for sending the routing data request, which enters from a prescribed line interface, to the main controller, sending the routing data from said main controller to a line interface of the requesting source, and switching a packet with attached routing data based upon the routing data to send the packet to another line interface, wherein said main controller has routing data generators, each associated with a line speed;

said line interface adds a line identifier onto a destination address of a packet that arrives from a line, creating the routing-data request and notifying said main controller of routing data;

said main controller responds to the request by generating routing data from whichever routing data generator corresponds to a line speed indicated by the line identifier and sending this routing data to the line interface that is the requesting source.

2. The apparatus according to claim 1, wherein said routing data generator of said main controller includes:

an associative memory for storing routing data;

a key-data memory for storing key data conforming to destination addresses;

a converter which, when key data conforming to the requested destination address exists in said key-data memory, is for converting this key data to an address of said associative memory; and a rousing-data sending unit for reading routing data out of the associative memory from this address and sending this routing data to the line interface that is the requesting source.

3. The apparatus according to claim 2, wherein said main controller is provided in duplicate to furnish a working main controller and a standby main controller;

when the working main controller updates content stored in each of said memories, said main controller updates also content stored in each of the memories of the standby main controller; and when the working main controller develops a failure, the standby main controller continues routing control by serving as a new working main controller.

4. The apparatus according to claim 1, wherein lines having any line speeds are connected to said line interface.

5. The apparatus according to claim 2, wherein each line interface adds a key flag onto a packet for the routing-data request to be sent to said main controller, adds a data flag onto a packet and inputs the result to said switch; and said switch sends the packet with the attached key flag to said main controller and sends the packet with the attached data flag to a line interface on the output side based upon the routing data.

6. A muting apparatus for obtaining routing data conforming to a destination address of a packet that arrives from a line, adding the routing data onto the packet, and switching the packer based upon the routing data to send the packet to a prescribed line, comprising:

a main controller having a routing data generator for generating routing data conforming to a requested destination address and sending the routing data to a requesting source;

a line interface for extracting a destination address from a packet that arrives from a line, generating routing-data request for requesting said main controller to be notified of routing data conforming to this destination address, adding the routing data of which notification has been given by said main controller onto the packet and then outputting the packet; and a switch for sending the routing data request, which enters from a prescribed line interface, to the main controller, sending the routing data from said main controller to a line interface of the requesting source, and switching a packet with attached routing data based upon the routing data to thereby send the packet to another line interface, wherein said routing data generator of said main controller includes;

an associative memory for storing routing data;

a key-data memory for storing key data conforming to destination addresses;

a converter which, when key data conforming to the requested destination address exists in said key-data memory, is for converting this key data to an address of said associative memory; and a routing-data sending unit for reading routing data out of the associative memory from this address and sending this routing data to the line interface that is the requesting source, and wherein said associative memory and said key-data memory are constituted by contiguous key-data and associative-data storage areas, respectively, of a single memory array;

an entry count e, which is the number of items of key data and the number of items of associative data that can be registered, is calculated in accordance with the following equation:

$e = y/(k+r)$ where y represents the total number of single-byte cells of said memory array, the width of the key data is k bytes and the width of the associative data inclusive of routing data is r bytes; and read/write control is performed for reading and writing the key data and associative data from and to said key-data storage area and associative-data storage area, respectively, of said memory array based upon k, r and e.

7. The apparatus according to claim 6, wherein said routing data generator further includes:

a register for holding the width k of key data, the width r of associative data and the entry count e; and an address decoder for performing read/write control of key data and associative data based upon K, r and e.

8. The apparatus according to claim 6, wherein said routing data generator timber includes:

holding means which, when multiple items of key data that are identical with key data conforming to the requested destination address or multiple items of key data that are identical with a non-masked portion of the key data conforming to this destination address have been entered in said key-data memory, is for holding the number of entries and the entry key data; and means for notifying an external processor of the number of entries and entry key data.

* * * * *